United States Patent
Smith

(10) Patent No.: US 12,212,817 B2
(45) Date of Patent: Jan. 28, 2025

(54) METHODS AND SYSTEMS FOR CONTENT OUTPUT ADJUSTMENT

(71) Applicant: Comcast Cable Communications, LLC, Philadelphia, PA (US)

(72) Inventor: Caleb Smith, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/138,297

(22) Filed: Dec. 30, 2020

(65) Prior Publication Data

US 2022/0210518 A1    Jun. 30, 2022

(51) Int. Cl.
*H04N 21/485* (2011.01)
*G06F 3/16* (2006.01)
*H04N 21/439* (2011.01)

(52) U.S. Cl.
CPC ......... *H04N 21/4852* (2013.01); *G06F 3/165* (2013.01); *H04N 21/4394* (2013.01); *H04N 21/4854* (2013.01); *H04N 21/4858* (2013.01)

(58) Field of Classification Search
CPC ........... H04N 21/4852; H04N 21/4394; H04N 21/4854; H04N 21/4858; G06F 3/165
See application file for complete search history.

(56) References Cited

U.S. PATENT DOCUMENTS

| | | | |
|---|---|---|---|
| 2007/0209047 A1* | 9/2007 | Hallberg | H04N 21/4312 725/9 |
| 2012/0054664 A1* | 3/2012 | Dougall | H04L 65/80 715/772 |
| 2013/0198767 A1* | 8/2013 | Wang | H04N 21/6583 725/14 |
| 2014/0118392 A1* | 5/2014 | Tran | H04N 21/4532 345/619 |
| 2015/0128162 A1* | 5/2015 | Ionescu | H04N 21/2668 725/14 |
| 2017/0006351 A1* | 1/2017 | Haberman | H04N 21/4126 |
| 2017/0034024 A1* | 2/2017 | Dushyanthan | H04L 43/0852 |
| 2017/0250882 A1* | 8/2017 | Kellicker | H04L 67/535 |
| 2018/0048921 A1* | 2/2018 | Sood | H04L 67/14 |
| 2019/0132628 A1* | 5/2019 | Ramaley | H04L 65/4084 |
| 2019/0208281 A1* | 7/2019 | Niebres | H04N 21/234372 |

* cited by examiner

*Primary Examiner* — Kyu Chae
(74) *Attorney, Agent, or Firm* — Ballard Spahr LLP

(57) ABSTRACT

Telemetry data gathered based on content item output/playback may be used to determine/generate adjustment data that may improve the output/playback experience for future content item output/playback. The adjustment data may cause output/playback adjustments at/by an output device (e.g., a content output device, a content/media player, a client device, a mobile device, a smart device, etc.) to mitigate and/or resolve any output/playback issues caused by one or more errors associated with the content item.

20 Claims, 10 Drawing Sheets

```
Event {
301 ──────────▶ media_id // EpisodeA
302 ──────────▶ time_in_media // 10 minutes
                action {
303 ──────────────▶ name // volume_down
304 ──────────────▶ value_type // 20, percent
                }
}
```

FIG. 3A

```
Adjustment {
305 ──────────▶ media_id // EpisodeA
306 ──────────▶ time_range // 10 minutes to 15 minutes
                adjustment {
307 ──────────▶ property_name // volume_down
308 ──────────────▶ value_type // 20, percent
                }
}
```

FIG. 3B

```
#EXTM3U
#EXT-X-TARGETDURATION:2
#EXT-X-VERSION:4
#EXT-X-MEDIA-SEQUENCE:0
#EXT-X-PLAYLIST-TYPE:VOD
#EXTINF:2.000,
segment_0.ts
#EXTINF:2.000,
segment_1.ts      309
**#EXT-X-
ADJUSTMENT:PROPERTY="volume_down",VALUE="20",VALUEFORMAT="percent"
,DURATION="300.0"**
#EXTINF:2.000,
segment_2.ts
#EXTINF:2.000,
segment_3.ts
#EXTINF:2.000,
segment_4.ts
// playlist continues
```

```
<Period id="20171" start="PT0H0M0.000S">
```
314 → `<EventStream schemeIdUri="urn:adjustment" >` ← 316
315 → `  <Event presentationTime="600" duration="300">`
317 → `   <Adjustment property="volume_down" value="20" valueFormat="percent"/>`
```
  </Event>
 </EventStream>
 .......
 .
</Period>
```

FIG. 3D

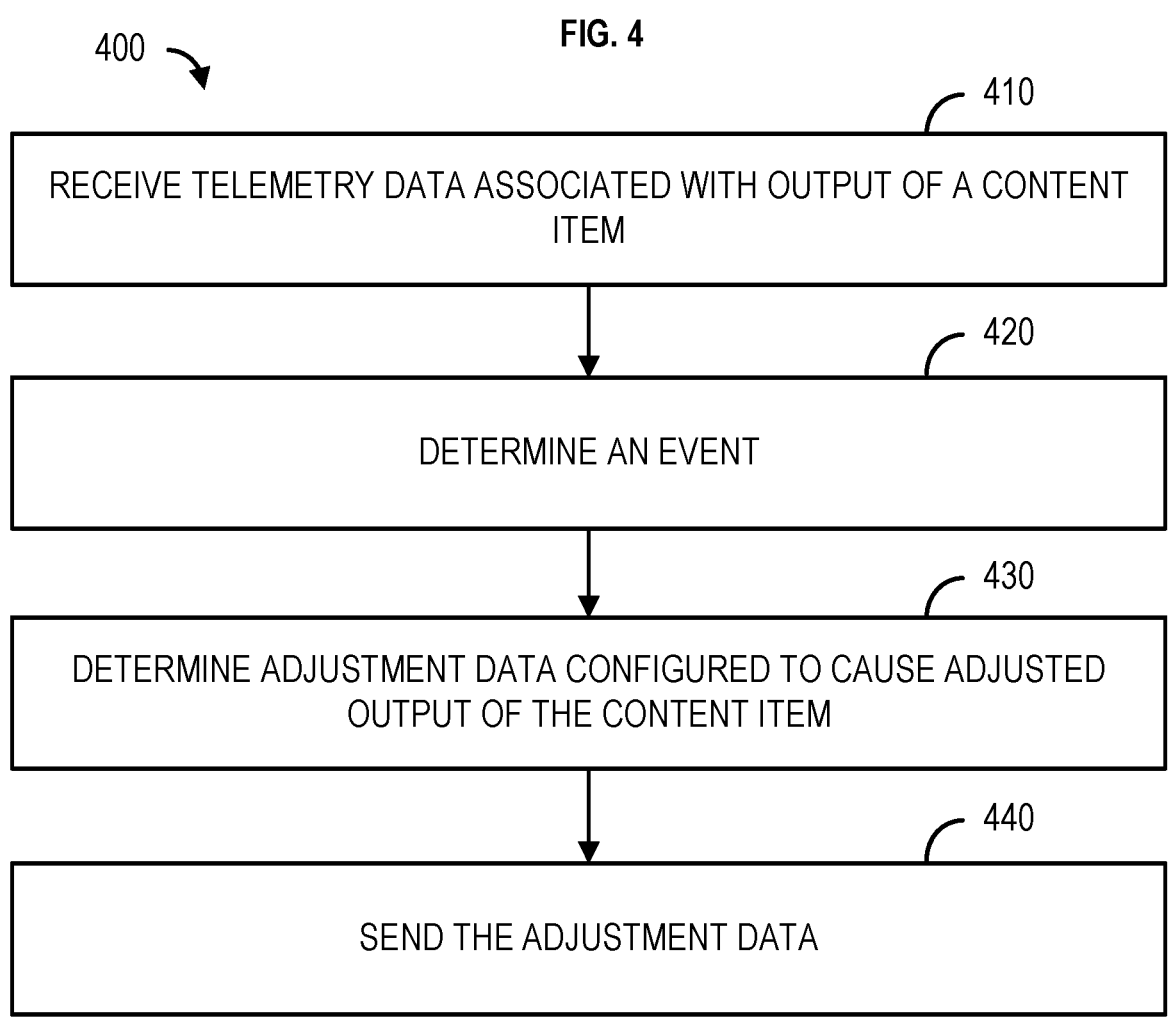

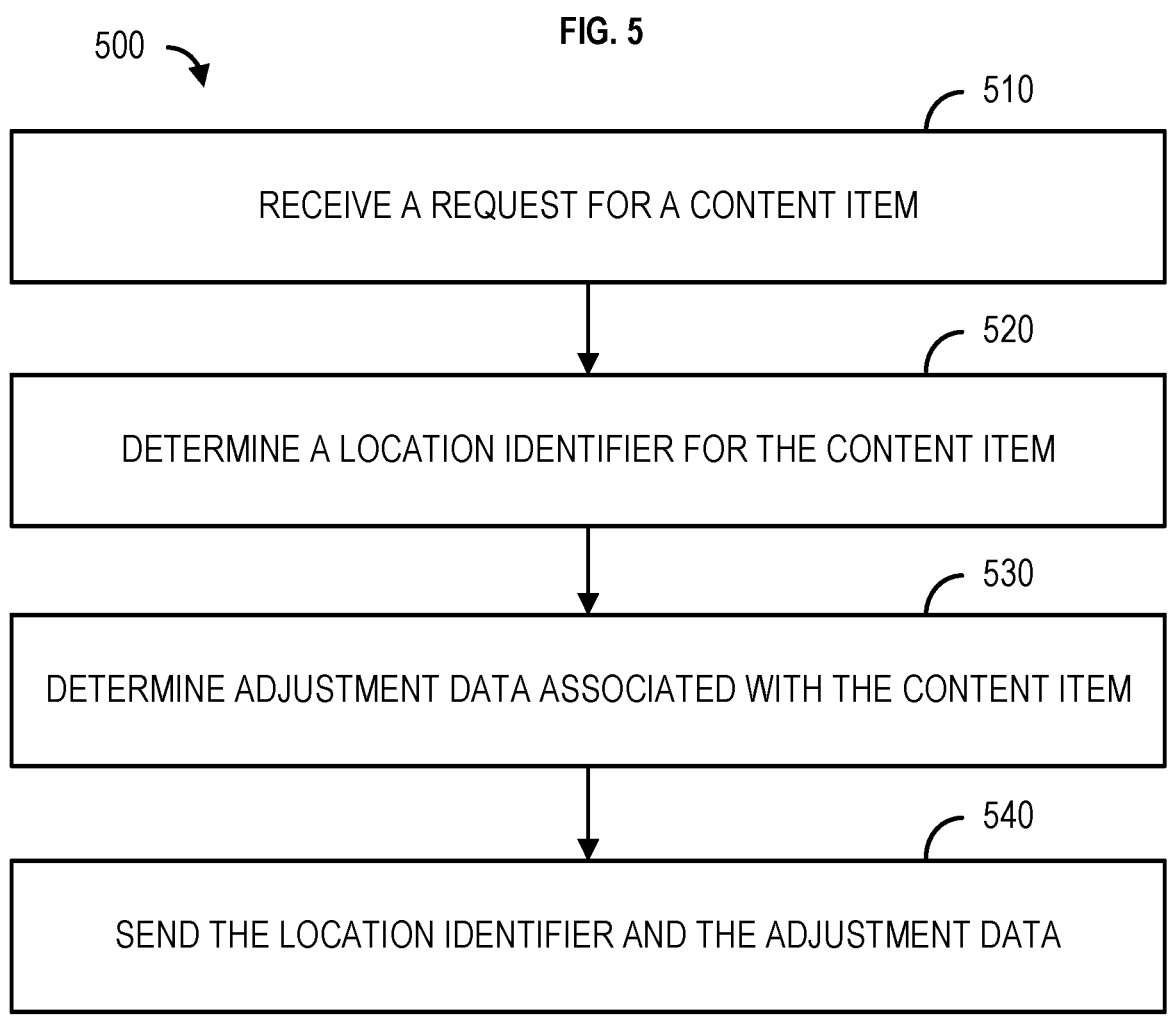

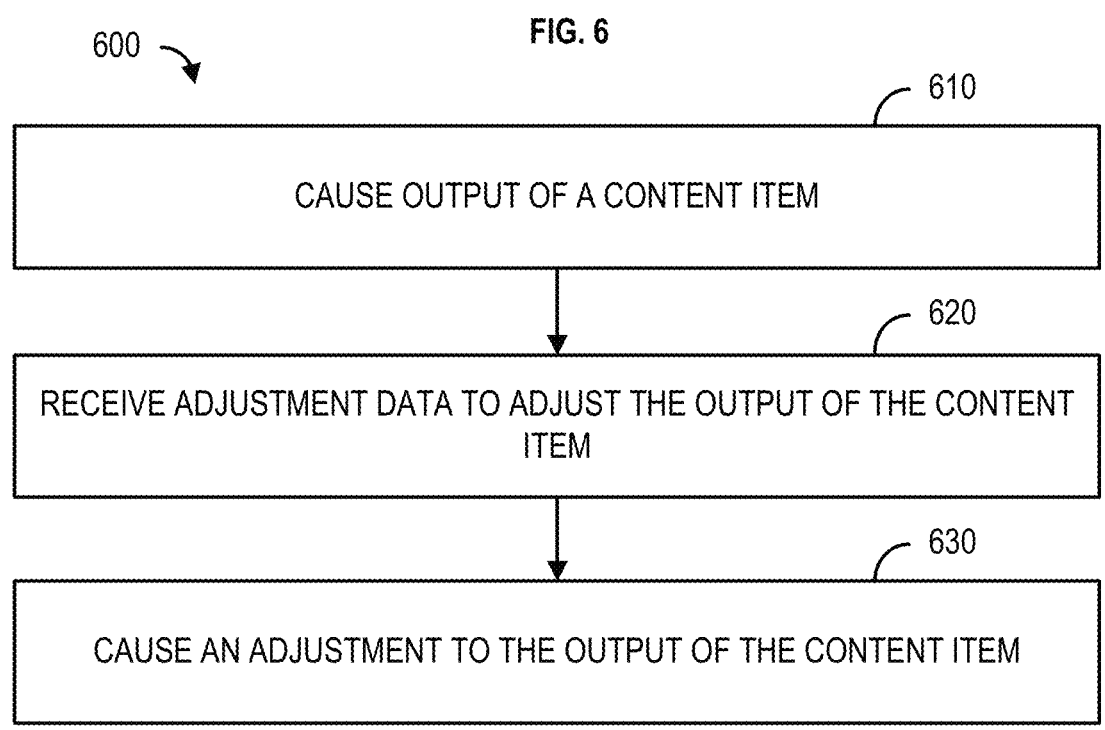

METHODS AND SYSTEMS FOR CONTENT OUTPUT ADJUSTMENT

BACKGROUND

Content (e.g., a movie, a show, a program, a content item, video, audio, games, applications, data, etc.) may have one or more errors (e.g., defects) that result in one or more output/playback issues when output by a user device. These errors disrupt the user experience. Errors in the content may, for example, distort video/audio, cause occurrences of amplified and/or attenuated audio, cause occurrences of suboptimal color and/or suboptimal brightness relative to display of the content, and/or the like. For example, errors may cause: a portion of a movie/show to stall/freeze, a portion of a movie/show where audio is much louder or quieter relative to other portions of the movie, and/or a portion of a movie/show where the color/brightness is too intense and/or requires some other adjustment. Without manual inspection of each segment, portion, and/or frame of the content, such errors are difficult (if not impossible) to identify. Additionally, once an error is identified in a content, the error needs to be fixed, the solution tested, and the content must be re-encoded. Repairing the error and re-encoding the content is time consuming, costly, and resource exhaustive.

SUMMARY

It is to be understood that both the following general description and the following detailed description are exemplary and explanatory only and are not restrictive. Methods and systems for content output/playback adjustment are described.

Errors may cause one or more user devices (e.g., content output devices, content/media players, client devices, mobile devices, smart devices, etc.) to experience output/playback issues during output/playback of a movie, a show, and/or the like. The output/playback issues may include, for example, distorted audio/video, stalled/delayed audio/video, and/or the like. A network device (e.g., a server, an aggregation device, an edge device, etc.) may collect telemetry data indicative of the output/playback issues experienced by each of the one or more user devices. The telemetry data may be used to determine adjustment data, such as code, instructions, resource locators, and/or the like, that may trigger adjustments that mitigate or otherwise resolve the errors. The adjustments may be made, for example, at a user device. If another user device requests the movie, the show, and/or the like, the adjustment data may also be sent to that user device to automatically mitigate and/or resolve any output/playback issue caused by the errors.

BRIEF DESCRIPTION OF THE DRAWINGS

The accompanying drawings, which are incorporated in and constitute a part of this specification, together with the description, serve to explain the principles of the methods and systems:

FIG. 3A shows example telemetry data indicative of an event associated content output adjustment;

FIG. 3B shows example adjustment data for content output adjustment;

FIG. 3C shows example adjustment data for content output adjustment;

FIG. 3D shows example adjustment data for content output adjustment;

FIG. 4 shows a flowchart of an example method for content output adjustment;

FIG. 5 shows a flowchart of an example method for content output adjustment;

FIG. 6 shows a flowchart of an example method for content output adjustment;

DETAILED DESCRIPTION

Figure 1:
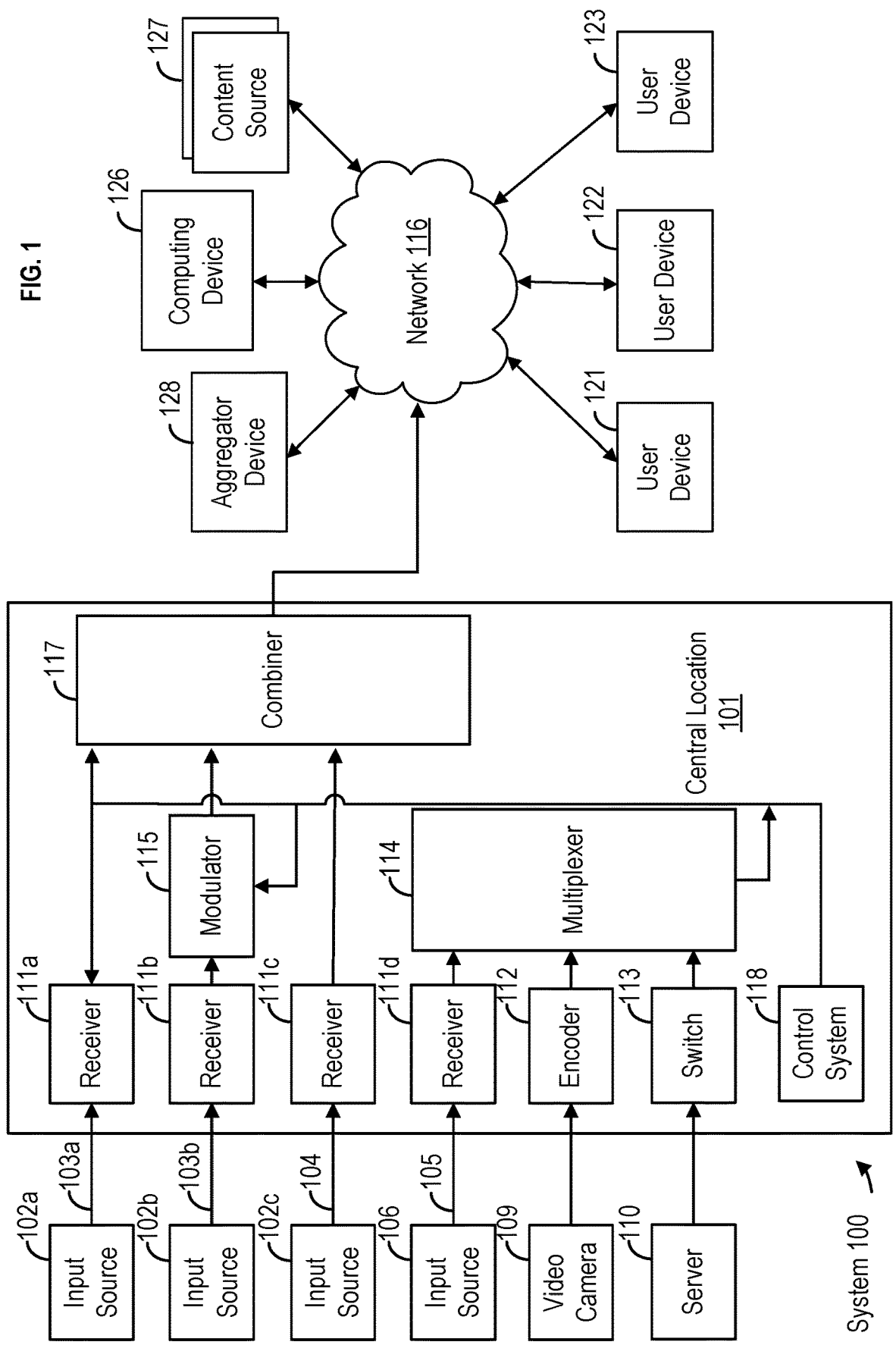
FIG. 1 shows an example system for content output adjustment.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content may include a movie, a television show, a sporting event, a news broadcast, a program, a commercial, video, audio, games, applications, data, and/or the like. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A content item may include and/or be associated with one or more errors. For example, the one or more errors may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like. The content item may be transmitted/sent to one or more user devices (e.g., content output devices, content/media players, client devices, mobile devices, smart devices, etc.) that each experience similar output/playback issues caused by the one or more errors associated with the content item.

Output/playback (e.g., output, display, etc.) issues caused by the one or more errors may include: one or more portions of the content item that stall/freeze during output/playback, one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to display of the content item, etc.). One or more actions may be performed at and/or associated with the one or more user devices to resolve any output/playback issue caused by the one or more errors, such as an adjustment in volume, an adjustment in color/brightness, and/or the like.

One or more events may occur during an output/playback of a content item. One or more errors associated with the content item, any output/playback issue caused by one or more errors, and/or any action performed by and/or via a user device during output/playback of the content item in response to an output/playback issue may indicate and/or correspond to an event occurring during output/playback of the content item. For example, a user device may request and output/playback (e.g., output, cause output, display, cause display, etc.) content. At a given point during the output/playback, the content may: halt/freeze, include distorted images/content, cause output of amplified and/or attenuated audio which causes the volume to be adjusted, cause intense visual output which causes an adjustment in color/brightness, and/or the like. The halt/freeze and/or distorted images/content during output/playback (e.g., the one or more errors), the volume adjustment, and the adjustment in color/brightness may be logged, stored, and/or identified as an event.

Any logged, stored, and/or identified event (or an indication thereof) may be included with telemetry data associated with the one or more user devices. Each user device may generate telemetry data that includes one or more indications of one or more events. For example, each user device may request and output/playback (e.g., output, cause output, display, cause display, etc.) the content and/or content item, and each of the user devices may adjust the volume at the same point during the output/playback duration, or each user device may experience output/playback issues caused by errors (e.g., distorted images/content, halting/freezing content, etc.) at the same point during the output/playback duration. Each of the volume adjustments at the user devices and associated timing information or experienced output/playback issue and associated timing information may be sent to a network device (e.g., a server, an aggregation device, an edge device, etc.) as telemetry data indicative of events. The network device may be configured to aggregate events.

Telemetry indicative of events may be aggregated and if a threshold quantity of events is determined/received, adjustment data may be generated to improve the output/playback (e.g., output, display, etc.) experience associated with any subsequent request for the content item. Based on the aggregated events, it may be determined, for example, by the network device, that a similar event (e.g., an output/playback issue caused by one or more errors, actions taken to resolve the output/playback issue, etc.) is affecting a given quantity of user devices. Based on the determination that a similar event is affecting the given quantity of user devices, adjustment data may be generated, determined, and/or associated with the content item. For example, the network device may generate and/or cause adjustment data to be associated with the content item. The adjustment data may be sent with the content item whenever a subsequent request for the content item is received. The adjustment data may include code, operational instructions, resource locators, an executable file, and/or the like, sent to the user device with the content item (e.g., a manifest file associated with the content item, etc.), for example, as a sidecar file.

The adjustment data may be an indication and/or instruction to a user device and/or a device associated with the user device (e.g., a remote control, a mobile device, etc.) that action needs to be and/or should be performed to affect output/playback of the content item at the point during output/playback of the content item where the event occurs. The adjustment data may trigger adjustments at the user device that mitigate and/or resolve any output/playback issue caused by errors associated with the content item. For example, the adjustment data may cause the user device to automatically request one or more codecs associated with the content item, adapt/adjust a bitrate of the content item, request one or more portions of the content item from a different source, adjust an output/playback volume of the content item, adjust a brightness and/or color display of the content item, and/or the like to improve the user experience during output/playback of the content item.

FIG. 1 shows a system 100 for content delivery that enables content output/playback (e.g., output, display, etc.) adjustment. Those skilled in the art will appreciate that digital equipment and/or analog equipment may be employed. One skilled in the art will appreciate that herein is a functional description and that the respective functions may be performed by software, hardware, or a combination of software and hardware.

The system 100 enables telemetry data associated with output/playback of a content item (e.g., a movie, a show, a program, content, video, audio, games, applications, data, etc.) to be used to determine output/playback adjustment data. Telemetry data may include, for example, data/information from various data sources configured with and/or associated with a user device (e.g., a content output device, a content/media player, a client device, a mobile device, a smart device, etc.). For example, various data sources configured with and/or associated with a user device may include an application and/or API, a processor, a buffer, a sensor (e.g., haptic sensor, infrared sensor, an audio/voice detection device, and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include an identifier (e.g., a Media Access Control (MAC) address, a network and/or Internet Protocol (IP) address, a device type identifier, etc.) of a user device associated with the telemetry data that may identify the user device and/or the various data sources configured with and/or associated with a user device. Telemetry data may include and/or be formatted as chunks/fragments of information typically used in multimedia formats, metadata, and/or the like.

Telemetry data may include one or more indications of an event associated with output/playback of a content item. For example, a user device may request and output/playback a movie, a show, a program, and/or the like. At a given point during the output/playback, the movie, the show, the program, and/or the like may: halt/freeze, include distorted images/content, cause the output of amplified and/or attenuated audio which causes the volume to be adjusted, cause intense visual output which causes an adjustment in color/brightness, and/or the like. The halt/freeze and/or distorted images/content during output/playback (e.g., the one or more errors), the volume adjustment, and the adjustment in color/brightness may each be logged, stored, and/or identified as an event.

Adjustment data may be used to improve the output/playback experience associated with the content item by triggering adjustments at a user device (e.g., a content output device, a content/media player, a client device, a mobile device, a smart device, etc.) that mitigate and/or resolve any output/playback issues.

The system 100 may include a central location 101 (e.g., a headend), which may receive content, data, and/or information from multiple sources. The central location 101 may combine the content from the various sources and may distribute the content to a user (e.g., subscriber) location and or user device (e.g., a content output device, a content/media player, a client device, a mobile device, a smart device, etc.) via a network 116 (e.g., a content distribution network, a content access system, etc.). The central location 101 may receive content from a variety of sources 102a, 102b, and 102c. The content may be sent from any of the sources 102a, 102b, or 102c to the central location 101 via a variety of transmission paths, including wireless paths (e.g., satellite paths 103a, 103b) and terrestrial paths 104. The central location 101 may also receive content from input 106, such as a direct feed source, via a direct line 105 (e.g., one or more communication links and/or one or more communication paths). Other input sources may be capture devices such as a video camera 109 or a server 110. The content sent by the content sources may comprise a single content item, a portion of a content item (e.g., content fragment), a content stream, a multiplex that includes several content items, and/or the like.

Content and/or content items, such as content and/or content items received at the central location 101, may include and/or be associated with one or more errors. For example, the one or more errors may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like. Some errors associated with content and/or content items may be generated, introduced, and/or caused during the creation of the content and/or content items, due to handling by one or more components/devices (e.g., encoders, decoders, transcoders, packagers, etc.) associated with the content and/or content items, and/or due to propagation through the system 100 and/or any other system/ network from a source of the content and/or content items to a receiver of the content and/or content items.

For example, the central location 101 may have one or a plurality of receivers 111a, 111b, 111c, 111d that are associated with one or more corresponding input sources. The central location 101 may include one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from a video camera 109 and/or other source and apply one or more encoding algorithms to the received content. A switch 113 may enable access to a server 110, which may be a Pay-Per-View server, a data server, an internet router, a network system, a phone system, and the like. Some signals may require additional processing, such as signal multiplexing, before being modulated. Such multiplexing may be performed by a multiplexer 114. One or more errors associated with content and/or content items may be generated, introduced, and/or caused by the encoder 112 when encoding the content and/or content items.

The central location 101 may include one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116. One or more errors associated with content and/or content items may be generated, introduced, and/or caused when the content and/or content items are combined (e.g., packaged) for input into the network 116.

The network 116, and the system 100 generally, may be a content distribution network, a content access network, and/or the like. The network 116 may be configured to send content from a variety of sources using a variety of network paths, protocols, devices, and/or the like. The network 116 may be managed (e.g., deployed, serviced) by a content provider, a service provider, and/or the like. The network 116 may have a plurality of communication links connecting a plurality of devices.

The functions and performance of system 100 may be monitored and controlled, for example, via a control system 118 and/or an associated device. For example, the control system 118 may interface, monitor, and/or control a variety of functions, including, but not limited to, the channel lineup for a television system, billing for each user, conditional access for content distributed to users, and the like. The control system 118 may send input to the modulators 115 for setting operating parameters, such as system specific MPEG table packet organization or conditional access information. The control system 118 may be located at the central location 101 or at a remote location.

Signals may be sent, transmitted, distributed, and/or the like from the central location 101 to user locations and/or user devices 121, 122, and 123 (e.g., content/media players, client devices, mobile devices, smart devices, etc.), for example, via the network 116. The network 116 may be, for example, an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. One or more errors associated with content and/or content items, such as one or more errors induced by network latency and/or bandwidth limitations, may be generated introduced, and/or caused when the content and/or content items are distributed through the network 116.

The system 100 may include one or more content sources 127. The content source 127 may be configured to send content to the user devices 121, 122, and 123. The content source 127 may be configured to send streaming media, such as on-demand content, content recordings, and/or the like. The content source 127 may be managed by third-party content providers, service providers, online content providers, over-the-top content providers, and/or the like. The content may be available via a subscription, by individual item purchase or rental, and/or the like. The content source 127 may be configured to send the content via a packet-switched network path, such as via an internet protocol (IP) based connection. The content may be accessed by users and/or the user devices 121, 122, and 123 via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The system 100 may include a computing device 126 (e.g., a transcoder/packager, a server, etc.). The computing device 126 may receive requested content items (e.g., videos, video/audio assets, movies, programs, shows, etc.) from the content source 127 and send the requested content items downstream to an aggregator device 128 which may, in turn, send the content items to the user devices 121, 122, and 123.

Bitrate conversion, coder/decoder (CODEC) conversion, frame size conversion, and/or the like may be performed, for example, by/via the computing device 126. For example, the computing device 126 may receive a content item from the content source 127 and transcode the content item to generate one or more transcoded streams, such as a live stream, a video-on-demand (VOD) stream, and/or the like. One or more transcoded streams may correspond to a different adaptive bitrate (ABR) representation of a content item. For example, transcoded streams may differ from each other with respect to one or more of audio bitrate, number/quantity of audio channels, audio CODEC, video bitrate, video frame size, video CODEC, etc. One or more errors associated with content and/or content items may be generated introduced, and/or caused during bitrate conversion, coder/decoder (CODEC) conversion, frame size conversion, and/or the like of the content and/or content items. For example, one or more errors may be caused by lossy data compression that causes compression artifacts (e.g., block boundary artifacts, etc.).

The one or more transcoded streams may be made available to the user devices 121, 122, and 123 for adaptive streaming and/or download. For example, a single high bitrate source content item may be used to generate one or more representations of the content item that have lower bitrates and/or alternative CODECs on-the-fly. As an example, a CODEC switch from an H.264/advanced audio coding (AAC) input stream to a VP8 representation and a Vorbis representation may be performed. For example, audio formats may be switched from a surround sound format to a stereo format. The computing device 126 may transcode the content items such that key frames (e.g., intra-coded frames (I-frames)) in each of the transcoded content items occur at the same time as in the source content item. That is, each of the transcoded content items may be "key frame aligned" to enable seamless switching between different ABR representations by a destination device (e.g., the user devices 121, 122, and 123, etc.). One or more errors associated with content and/or content items may be generated, introduced, and/or caused, for example, during transcoding of the content and/or content items to various representations.

Packaging and segmentation of transcoded content items may be performed, for example, by/via the computing device 126. For example, the computing device 126 may divide a set of ABR representations (e.g., transcoded content items) into media segments. For example, the computing device 126 may determine/receive a target segment duration. The target duration may be, for example, approximately ten thousand milliseconds. The target segment duration may be received, for example, via user input or a configuration file. Alternately, the target segment duration may be dynamically determined based on properties of the source content item, the computing device 126, etc. For example, if the target segment duration is ten seconds, the computing device 126 may break transcoded content items into segments at key frame boundaries approximately ten seconds apart. Further, if the transcoded content items include separate video and audio streams, the computing device 126 may generate the segments such that the video and audio streams are timecode aligned. One or more errors associated with content and/or content items may be generated, introduced, and/or caused, for example, when/if timecodes associated with segments of the various representations of the content and/or content items are misaligned.

Multiple content segmentation types may be supported and segments may be generated accordingly, for example, by/via the computing device 126. Segments may alternately be referred to as "chunks." The computing device 126 may support both multiplexed segments (video and audio data included in a single multiplexed stream) and non-multiplexed segments (video and audio data included in separate non-multiplexed streams). Further, in the case of MPEG-DASH, the computing device 126 may be configured to support container formats in compliance with international standards organization base media file format (ISOBMFF and any extensible file format, etc.), motion picture experts group 2 transport stream (MPEG-TS), extensible binary markup language (EBML), WebM, Matroska, or any combination thereof. The computing device 126 may be, for example, configured to employ a "smart" storage system to avoid replicating audio/video data when generating segments for each content segmentation type. For example, if the computing device 126 supports N content segmentation types (where N is an integer greater than zero), the computing device 126 may generate N segment templates for each segment (e.g., ten-second portion) of each transcoded content item. Each segment template may comprise header information associated with a content segmentation type, data indicating a start position or start time of the segment in the source content item, and data indicating an end position or end time of the segment in the source content item. Thus, in the case of MPEG-DASH, different segment templates may be generated for ISOBMFF multiplexed ("muxed"), ISOBMFF non-multiplexed ("demuxed"), MPEG-TS muxed, MPEG-TS demuxed, EBML muxed, EBML demuxed, etc. In an embodiment, each of the segment templates may not include the underlying audio/video data of the corresponding segment. Thus, even though multiple segment templates may be generated for each segment of the source content item, the underlying segment audio/video data may be stored once. As the segment templates are generated, the computing device 126 may generate and use segment information regarding the segment templates to format a content item reference file and/or resource locators, such as a playlist, a manifest file, a media presentation description (MPD) file, and/or the like. One or more errors associated with content and/or content items may be generated, introduced, and/or caused by corrupted and/or incorrect segment templates used to generate content item reference file and/or resource locators, such as a playlist, a manifest file, a media presentation description (MPD) file, and/or the like.

A content item reference file and/or information may identify one or more segments of one or more adaptive streaming representations of a source content item. For example, transcoded content items generated by the computing device 126 may include three ABR representations of a source content item: a first representation with a bitrate of 2 megabits per second (Mbps) and a frame size of 720p, a second representation with a bitrate of 750 kilobits per second (Kbps) and a frame size of 360p, and a third representation with a bitrate of 250 kbps and a frame size of 120p. More, fewer, and/or different adaptive streaming representations may be generated by the computing device 126, where each generated adaptive streaming representation(s) has a plurality of key frame aligned segments. The computing device 126 may generate content item reference files and/or information based on the segment information, including information regarding the segment(s) of the adaptive streaming representation(s) that are generated. Different content item reference files and/or information may be generated for each of the user devices 121, 122, and 123 that requests a content item reference file. One or more errors associated with content and/or content items may be generated, introduced, and/or caused by corrupted and/or incorrect content item reference file and/or resource locators, such as incorrect and/or corrupted manifest files, media presentation description (MPD) files, and/or the like that do not properly represent a resource location and/or associated bitrate for a segment/portion of the content and/or content items.

A common format and/or template (e.g., segment templates, etc.) may be used to generate different types of content reference files associated with a content item, such as a manifest, an HTTP Live Streaming (HLS) playlist, or Dynamic Adaptive Streaming over HTTP (DASH) MPD file associated with the content item. One or more output/playback issues associated with the content item may result from the generation of different types of content reference files associated with a content item, such as a manifest, an HTTP Live Streaming (HLS) playlist, or Dynamic Adaptive Streaming over HTTP (DASH) MPD file. For example, a manifest, an HLS playlist, and/or a DASH MPD file may each be configured/formatted to be parsed and interpreted by a user device, but may also each include one or more errors. The one or more errors may include misrepresentation and/or advertisement of, for example, more or less, segments of a content item that are associated with and/or should be associated with a content item. The manifest, the HLS playlist, and/or the DASH MPD file may include inaccurate bitrate representations of a content item. The manifest, the HLS playlist, and/or the DASH MPD file may cause errors (e.g., bitrate errors, codec errors, playlist errors, protocol errors, etc.) associated with a content item that results in output/playback issues associated with the content item.

As described further herein, adjustment data may be used to mitigate and/or resolve any output/playback issues caused by a content reference file. Adjustment data may convey and/or be used to convey overrides to information indicated in a content reference file. Adjustment data may cause a user device to request content at a bitrate that is different than what is indicated in a content reference file for one or more segments/portions of a content item. For example, one or more user devices may be able to each adapt a bitrate for one or more segments/portions of a content item to a higher/lower bitrate during output/playback of the content item, but may each experience similar output/playback issues when doing so. Adjustment data may cause one or more user devices to output/playback the content item at a bitrate that is different than what may be indicated in the content reference file for adaptive bitrate adjustments, and instead output/playback the content item at a bitrate that resolves the similar output/playback issues.

Adjustment data may cause a user device to request one or more segments/portions of a content from one or more content sources that are different than what may be indicated in a content reference file for the one or more segments/portions of the content item. For example, one or more user devices may each request one or more segments/portions of a content item from a content source indicated by a content reference file, and each user device may experience a similar output/playback issue(s) when doing so. For example, each user device may receive a request error when requesting the segment/portion of the content item, experience a stall/freeze during output/playback of the segment/portion of the content item, and/or experience any other output/playback issue. Adjustment data may cause one or more user devices to request the one or more segments/portions of the content item from a content source that is different from what may be indicated in the content reference file to resolve the output/playback issue (similar output/playback issues). For example, a content reference file may include a resource locator (e.g., a Uniform Resource Locator (URL), etc.) for a segment/portion of a content item associated with an output/playback issue. Adjustment data associated with the content reference file (e.g., as a sidecar file, etc.) and/or configured with the content reference file may cause one or more user devices to request the segment/portion of the content item associated with the output/playback issue from a different content source from what may be indicated in the content reference file, for example, using a different resource locator (e.g., a different URL, etc.). Requesting the segment/portion of the content item from a different content source may resolve any errors associated with the content item caused by the original source of the content item and/or any errors associated with and/or introduced along a data path to the original source.

The system 100 may include an aggregator device 128 (e.g., an edge device, a server, a computing device, etc.). The aggregator device 128 may enable/send content, services, and/or the like to a destination device (e.g., the user devices 121, 122, and 123, etc.). The aggregator device 128 may be one of a plurality of aggregator devices distributed across the network 116. The aggregator device 128 may be located in a region proximate to the user devices 121, 122, and 123. A request for content from the user devices 121, 122, and 123 may be directed to the aggregator device 128 (e.g., due to the location of the aggregator device and/or network conditions). The aggregator device 128 may receive packaged content and/or content items (e.g., from the computing device 126, the central location 101, and/or any of the sources 102*a*, 102*b*, or 102*c*) for delivery to the user devices 121, 122, and 123, convert content and/or content items for delivery to the user devices 121, 122, and 123 (e.g., in a specific format requested by a user device), send the user devices 121, 122, and 123 a content item reference file (e.g., a playlist, a manifest file, an MPD file, an index file, etc.) describing portions of the content and/or content items, send streaming (e.g., unicast, multicast) content, enable/cause a file transfer, and/or the like. The aggregator device 128 may cache or otherwise store content and/or content items (e.g., frequently requested content and/or content items) to enable faster delivery of content and/or content items to user devices (e.g., the user devices 121, 122, and 123, etc.).

The aggregator device 128 may receive requests for content items from the user devices 121, 122, and 123 and send/transmit the requested content items to the user devices 121, 122, and 123. The aggregator device 128 may monitor output/playback (e.g., output, display, consumption, etc.) of content items sent/transmitted to the user devices 121, 122, and 123. The user devices 121, 122, and 123 may be configured to generate and send/transmit telemetry data regarding the state and/or operation of the user devices 121, 122, and 123, for example, during output/playback of a content item. The aggregator device 128 may receive and aggregate telemetry data related to output/playback of a content item at a user device (e.g., the user devices 121, 122, and 123, etc.).

Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device, and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include an identifier (e.g., a Media Access Control (MAC) address, a network and/or Internet Protocol (IP) address, a device type identifier, etc.) of a user device (e.g., the user devices 121, 122, and 123, etc.) associated with the telemetry data that may identify the user device and/or the various data sources configured with and/or associated with a user device. Telemetry data may include and/or be formatted as chunks/fragments of information typically used in multimedia formats, metadata, and/or the like.

The aggregator device 128 may analyze telemetry data received from the user devices 121, 122, and 123 for one or more events that indicate one or more output/playback issues caused by errors (e.g., bitrate errors, codec errors, playlist errors, protocol errors, etc.) associated with a content item during output/playback of the content item. For example, output/playback issues caused by one or more errors may include: one or more portions of a content item that stall/freeze during output/playback, one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to a display of the content item, etc.). To resolve any output/playback issue caused by the one or more errors, one or more actions may be performed at and/or associated with the one or more user devices, such as an adjustment in volume, an adjustment in color/brightness, and/or the like.

One or more events may occur during output/playback (e.g., output, display, etc.) of a content item. One or more errors associated with the content item, any output/playback issue caused by one or more errors, and/or any action performed by and/or via the user devices 121-123 during output/playback of the content item in response to an output/playback issue, may indicate and/or correspond to an event occurring during output/playback of the content item. For example, the user device 121 may request and output/playback a movie, a show, a program, and/or the like. At a given point during the output/playback of the movie, the show, the program, and/or the like, the volume may be reduced. The user device 121 may store/log the volume reduction as an event. Actions performed by and/or associated with a user device (e.g., the user devices 121, 122, and 123, etc.) in response to an output/playback issue may be associated with a threshold. For example, the volume reduction at the user device 121 may be associated with a volume reduction threshold.

One or more thresholds (e.g., volume adjustment thresholds, volume level thresholds, display color/intensity thresholds, video/audio synchronization thresholds, temporal thresholds for receiving one or more portions of a content item, content processing thresholds, etc.) associated with a user device may be configurable thresholds. The one or more thresholds may be locally configurable at/by the user device and/or remotely configurable, for example, by a service provider and/or any other device/component of the system 100. One or more thresholds may be dynamically determined, for example, based on the telemetry data received from the user device 121 and/or any other user device.

For example, the aggregator device 128 may analyze telemetry data received from the user device 121 (and/or any other user device) and determine, based on an identifier (e.g., a MAC address, a network and/or IP address, a device type identifier, etc.) of the user device 121, that the event is affecting a certain device type and/or configuration. The one or more thresholds may be dynamically determined, for example, contemporaneous to a request for a content item or to output/playback of a content item, based on data/information (e.g., historic data/information, real-time data/information, etc.) associated with the device type and/or configuration.

A request for a content item may cause a database to be accessed. The database may be accessed, for example by the aggregator device 128, based on the request for the content item or based on an indication (indicated by telemetry data, etc.) of output/playback of the content item. The database may store associations between one or more thresholds and device types and/or configurations. An identifier of the user device received with the request for the content item may be used to determine the one or more thresholds associated with the device type and/or configuration.

A request for a content item may cause a trained machine learning model and/or artificial intelligence to recommend one or more thresholds associated with a device type and/or configuration. For example, the trained machine learning model may use an identifier of a user device received with a request for a content item or received based on an indication (indicated by telemetry data, etc.) of output/playback of the content item to recommend one or more thresholds associated with a device type and/or configuration. The recommended one or more thresholds may be one or more thresholds that have been recently assigned to the same and/or similar device type and/or configuration. One or more thresholds associated with a user device may be determined by any method.

The user device 121 may store/log the volume reduction as an event based on satisfying a volume reduction threshold. If the volume reduction threshold is not dynamically determined, for example by the aggregator device 128 and/or based on a machine learning model, the volume reduction threshold may be locally determined at the user device 121. The volume threshold may be based on an averaged volume associated with the content item during output/playback. For example, from the start of output/playback of the content item until a given time point during the content item, the volume associated with the content item during output/playback may be averaged and set as a volume threshold. If the volume is then raised above and/or lowered below the threshold for a duration before returning to the averaged volume (e.g., within a threshold range of the averaged volume, etc.), then the raising and/or lowering of the volume may be stored/logged as an event. For example, a decrease in volume by one percent (1%) of the average volume at a particular point (segment/portion) of a content item may not be indicative of an event, whereas a volume reduction of ten percent (10%) or more of the average volume may indicate an event. A similar logging/storing of an event may occur for incidents of color, intensity, and/or any other adjustment to display of the content item during output/playback of the content item.

A logging/storing of an event may occur for incidents of any other output/playback issues such as incidents of blurred, choppy, and/or jittery video, halting/freezing of video, misaligned and/or unsynchronized video and audio, and/or any other output/playback issue that may be caused by one or more errors associated with the content item. Any logging/storing of an event may be based on one or more thresholds (e.g., volume adjustment thresholds, volume level thresholds, display color/intensity thresholds, video/audio synchronization thresholds, temporal thresholds for receiving one or more portions of a content item, content processing thresholds, etc.) configured/associated with a user device for triggering logging/storing of the event.

The user device 121 may send to the aggregator device 128, as telemetry data, the event with timing information that indicates when in the content item (e.g., at which duration/time during output/playback, etc.) the event occurred. The user device 122 may request and output/playback (e.g., output, cause output, display, cause display, etc.) the movie, the show, the program, and/or the like, and the user device 122 may also adjust the volume at the same point during the output/playback duration. The volume adjustment at the user device 122 and associated timing information may be sent to the aggregator device 128, as telemetry data indicative of an event.

Any logged, stored, and/or identified event may be included with telemetry data associated with the user devices 121, 122, and 123. The aggregator device 128 may aggregate events associated with output/playback of a content item to identify and/or determine similar events. Similar events and/or the same type of event being logged/stored and/or sent as telemetry data to the aggregator device 128 may indicate a particular output/playback issue affecting the content item. The aggregator device 128 may determine whether a threshold quantity of an output/playback issue (e.g., caused by one or more errors, etc.) affecting the content item exists based on a quantity of indications of the same type and/or similar event received with and/or determined from telemetry data. If a threshold quantity of a particular output/playback issue affecting the content item exists, rather than the time-consuming and/or costly (e.g., resource cost, processing cost, etc.) endeavor of having the computing device 126 re-encode the content item, adjustment data may be generated to address the output/playback issue during a subsequent output/playback of the content item by a user device (e.g., the user devices 121, 122, and 123, etc.). The threshold may be configured such that any number/quantity of occurrences of a particular event triggers the generation of adjustment data to improve the output/playback experience associated with any subsequent request for the content item. For example, occurrences of a particular event may include interactions with a user device (e.g., the user devices 201, 202, and 203, etc.). Telemetry data from multiple user devices that indicates multiple users tapping respective displays (e.g., determined via haptic feedback, etc.) of the user devices and/or performing trick play operations (e.g., fast forward, etc.) to move past a segment/portion of a content item may indicate problems, such as one or more errors, associated with the content item. The telemetry data from the multiple user devices may be used to determine and/or identify problematic segments/portions of the content item, such as a segment/portion of the content item associated with errors that cause the multiple users to tap the respective displays (e.g., determined via haptic feedback, etc.) of the user devices and/or perform the trick play operations (e.g., fast forward, etc.).

Adjustment data may be sent to a user device (e.g., the user devices 121, 122, and 123, etc.) based on any subsequent request for the content item. The adjustment data may include code, operational instructions, resource locators, an executable file, and/or the like, sent to the user device with the content item, for example, as a sidecar file and/or as information embedded in a content item reference file associated with the content item to mitigate and/or resolve associated output/playback issues.

Adjustment data may be device-specific data. For example, adjustment data may be generated/determined based on and/or to address (e.g., mitigate, resolve, etc.) an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to generate/determine adjustment data. Adjustment data may include device identifying information that identifies a device type and/or configuration of a user device that the adjustment data is configured for and/or associated with. For example, a sidecar file and/or content reference file including and/or associated with adjustment data may include multiple versions of the adjustment data. Each version of the adjustment data may include and/or be associated with device identifying information that identifies a device type and/or configuration of a user device that the version of adjustment data is configured for and/or associated with.

Adjustment data may be an indication and/or instruction to a user device (e.g., the user devices 121, 122, and 123, etc.) that the user device needs to and/or should perform some action to affect output/playback (e.g., output, display, etc.) of the content item at the point during output/playback of the content item when an event occurs, such as a volume adjustment. For example, adjustment data may cause a volume adjustment to automatically occur at the user device 123 at the point during output/playback of the content item when the events logged/stored by the user devices 121 and 122 occur. The aggregator device 128 may generate and/or determine adjustment data associated with any content item that triggers adjustments at user devices (e.g., the user devices 121, 122, and 123, etc.) that mitigate and/or resolve any output/playback issue.

Adjustment data may cause a user device to automatically request one or more codecs associated with a content item, adapt/adjust the bitrate of a content item, request one or more portions of a content item from a different source, adjust an output/playback volume of a content item, adjust a brightness and/or color display of a content item, and/or the like to improve the user experience during output/playback of a content item. For example, adjustment data may include an instruction that causes an audio level of the content item to satisfy an audio level threshold, an instruction that causes a display intensity level of the content item to satisfy a display intensity threshold, an instruction that causes an update of a codec associated with the content item, an instruction that causes a bitrate adjustment of the content item, and/or any other instruction that may mitigate and/or resolve an output/playback issue caused by one or more errors associated with the content item. Adjustment data may include an instruction that causes a user device to send a signal to a device associated with the user device (e.g., a mobile/smart device, a remote control, etc.) that causes the device to send a signal to the user device, that causes an audio level of the content item to satisfy an audio level threshold, an instruction that causes a display intensity level of the content item to satisfy a display intensity threshold, and/or the like. Adjustment data may include code, operational instructions, resource locators, an executable file, a software update, and/or the like.

Adjustment data may be associated with a content item. Adjustment data may be generated by the aggregator device 128. The aggregator device 128 may store and/or associate an identifier of the adjustment data with an identifier of the content item. The aggregator device 128 may store and/or associate the identifier of the adjustment data with the identifier of the content item for a time period and during the time period the adjustment data may be sent to any user device that requests the content item. The adjustment data may be stored with the content item. The adjustment data may be generated and/or updated, for example in real-time, and associated and/or configured with a content item reference file (e.g., a playlist, a manifest file, a MPD file, an index file, etc.) associated with the content item. The adjustment data may be associated with the content item reference file as a sidecar file. Adjustment data may be generated and/or updated as telemetry data associated with output/playback of a content item is aggregated and/or satisfies one or more associated thresholds. Accordingly, adjustment data may reflect the most recent user device output/playback experiences.

The aggregator device 128 may determine if adjustment data is associated with a content item whenever a request for the content item is received. For example, the user device 123 may request the content item previously received by the user devices 121 and 122. The aggregator device 128 may determine, for example, based on an identifier of the content item received with the request, that the content item is associated with the adjustment data. The aggregator device 128 may send/transmit to the user device 123 a content item reference file (e.g., a playlist, a manifest file, an MPD file, an index file, etc.) associated with the content item and the adjustment data. As explained, the adjustment data may be associated with the content item reference file as a sidecar file. Alternatively, the adjustment data may be configured and/or included with a content item reference file associated with the content item.

User devices (e.g., the user device 121-123, etc.) may be configured to periodically send a request, for example to the aggregator device 128, to determine the existence of adjustment data and/or receive updates to adjustment data. For example, user devices may periodically send requests for new and/or updated content item reference files (e.g., playlist, manifest files, MPD files, index files, etc.) associated with a content item that includes and/or is associated with adjustment data and/or updated adjustment data. When new adjustment data and/or updated adjustment data becomes available and/or associated with a content item after a user device has begun output/playback of the content item, the user device may receive the new adjustment data and/or updated adjustment data based on a periodic request and/or polling for the new adjustment data and/or updated adjustment data. In other words, rather than sending a single request for a content reference file associated with a content item (e.g., a static request for a content item, etc.), a user device may continuously request (e.g., dynamically request, etc.) the latest/newest content reference file associated with the content item that may also include adjustment data and/or a reference to the adjustment data.

Adjustment data generated for and/or associated with a content item may be sent to any user device (e.g., the user device 121-123, etc.) based on any request for the content item. An output/playback issue that adjustment data is generated for and/or determined to resolve may not affect output/playback of the content item at a particular user device, for example, based on the device type and/or configuration. A user device may determine if adjustment data, for example, received as a sidecar file or configured with a content reference file, is applicable to the user device. For example, a sidecar file including adjustment data and/or a content reference file configured with adjustment data may include one or more indications of device types and/or configurations to which the adjustment data is applicable (e.g., configured for, etc.) for resolving output/playback issues associated with a content item. The user device may determine if its device type and/or configuration is indicated by the adjustment data. When the device type and/or configuration of the user device is indicated by the adjustment data, the user device may output/playback the content item and make adjustments (e.g., bitrate adjustments, codec adjustments, protocol adjustments, volume/display adjustments, resource locator adjustments, etc.) to the output/playback of the content item based on the adjustment data. When the device type and/or configuration of the user device is not indicated by the adjustment data, the user device may ignore any instructions, suggestions, and/or configurations associated with and/or caused by the adjustment data, and output/playback the content item as requested and/or as indicated by a content reference file because any output/playback issue associated with the adjustment data may not be affecting and/or affect the user device.

A user device may selectively be affected by adjustment data received as a sidecar file or configured with a content reference file. A user device may determine that its device type and/or configuration is only associated with portions of adjustment data. For example, adjustment data may indicate that output/playback issues associated with a content item include volume control issues, display (e.g., color/intensity, etc.) issues, and issues such as pausing/freezing of content. Each output/playback issue may be a device-specific issue that only affects certain types of user devices. Each output/playback issue indicated by adjustment data may be associated with an indication of a device type and/or configuration. A user device may select portions of adjustment data that are associated with output/playback issues indicated to be affecting a device type and/or configuration associated with the user device. For example, a user device may select portions of adjustment data associated with volume control issues and ignore portions of the adjustment data associated with display (e.g., color/intensity, etc.) issues based on its device type and/or configuration.

Figure 2:
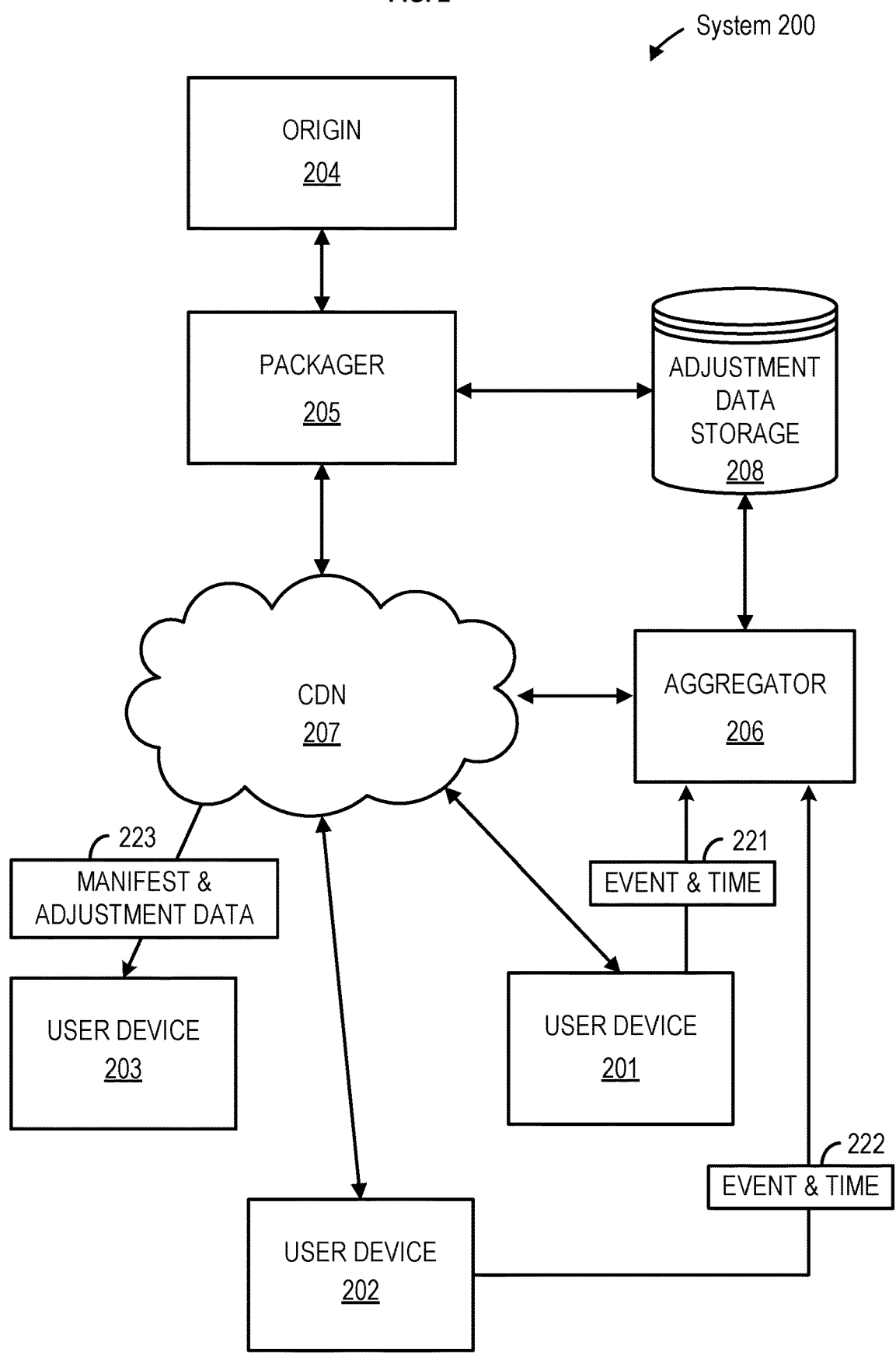
FIG. 2 shows an example system for content output adjustment.

FIG. 2 shows a system 200 for content output/playback adjustment. The system 200 enables telemetry data associated with output/playback (e.g., output, display, etc.) of a content item (e.g., a movie, a show, a program, content, video, audio, games, applications, data, etc.), received from one or more user devices 201, 202, and 203 (e.g., content/media players, client devices, mobile devices, smart devices, etc.), to be used to determine adjustment data. The adjustment data may be used to improve the output/playback experience associated with the content item by triggering adjustments at a user device (e.g., the user devices 201, 202, and 203, etc.) that mitigate and/or resolve any output/playback issues associated with the content item, such as output/playback issues caused by one or more errors associated with the content item. For example, one or more errors associated with a content item may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like. One or more output/playback issues associated with a content item caused by one or more errors may include: one or more portions of the content item that stall/freeze during output/playback, one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to the display of the content item, etc.).

An origin 204 (e.g., a content source, the content source 127, an origin, etc.) may output (e.g., be a source for) one or more content items (e.g., videos, video/audio assets, movies, programs, shows, etc.) distributed through a network to one or more user devices (e.g., content/media players, client devices, mobile devices, smart devices, user device 201-203, etc.). The origin 204 may divide a content item into "chunks," such as a respective plurality of portions/segments. Each of the portions/segments may correspond to a particular duration (e.g., one second of content, two seconds of content, five seconds of content, etc.) of the content item. Each of the portions/segments may be identified using a file name. The file name may include an identifier of the particular representation of a content item to which it corresponds. Content items from the origin 204 may be transmitted/sent to a packager 205.

Content items may be transcoded and fragmented before being sent/transmitted to the packager 205. Content items may be converted, for example, from one format (e.g., video format, audio format, etc.) to another format (e.g., video format, audio format, etc.), such as a format amenable to how the one or more user devices 201, 202, and 203 consume, view, and/or output/playback (e.g., output, cause output, display, cause display, etc.) the content items.

The packager 205 may receive content items from the origin 204 that have been transcoded, fragmented, and/or the like. The packager 205 may combine the content items that have been transcoded, fragmented, and/or the like into a packaged content asset. Packaged content items may be sent to the user devices 201, 202, and 203 to facilitate output/playback. To facilitate output/playback of a content item, the packager 205 may generate a manifest file (e.g., a content item reference file, an MPD file, an index file, a resource locator file, etc.) associated with the content item.

A manifest file may contain information describing various aspects of the associated content item that may be useful for the user devices 201, 202, and 203 to output/playback the content item and/or for other devices/components of the system 200 (e.g., the origin 204, an aggregator 206, etc.) to store and/or retrieve the content item. For example, a manifest file may indicate each of a plurality of segments/fragments of a content item, the output/playback duration of each segment/fragment, the number of segments/fragments, and/or the proper ordering of the segments/fragments necessary to effectuate an output/playback of the content item. A manifest file may comprise a network location (e.g., a hyper-text transfer protocol (HTTP) uniform resource locater (URL) link or other universal resource identifiers (URIs)) for each segment/fragment from which the segment/fragment may be downloaded, accessed, and/or retrieved. It will be appreciated that the network locations included within a manifest file may point to more than one different location or source. A manifest file may be sent/transmitted to any of the user devices 201, 202, and 203 in response to a request for a content item. The user devices 201, 202, and 203 may use a manifest file to determine segments/fragments required to output/playback a content item or a portion of the content item and subsequently download the required segments/fragments using the network locations specified in the manifest file.

The aggregator 206, for example, may receive and fulfill a request from any of the user devices 201, 202, and 203, via the content delivery network (CDN) 207, to deliver a content item to the user devices 201, 202, and 203 for output/playback. Request for content items may include identifications of the user devices 201, 202, and 203 (e.g., an account identifier, a username/password, etc.) and/or the requested content item. Based on a request for a content item, the aggregator 206 may send/transmit one or more manifest files from the packager 205 to the user devices 201, 202, and 203 via the CDN 207 that describe the content item and/or segments/fragments thereof, including network locations from which each segment/fragment may be downloaded. A manifest file enables the user devices 201, 202, and 203 to iteratively download and begin output/playback of a content item.

The output/playback of content items sent/transmitted to the user devices 201, 202, and 203 may be monitored. The aggregator 206 may monitor the output/playback of content items sent/transmitted to the user devices 201, 202, and 203. The user devices 201, 202, and 203 may be configured to generate and send/transmit telemetry data regarding the state and/or operation of the user devices 121, 122, and 123, for example, during output/playback of a content item. Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include and/or be formatted as chunks/fragments of information typically used in multimedia formats, metadata, and/or the like.

The aggregator 206 may receive and aggregate telemetry data related to output/playback of a content item at a user device (e.g., the user devices 201, 202, and 203, etc.) and/or the like. The aggregator 206 may analyze telemetry data received from user devices for one or more events that indicate one or more issues occurring during output/playback of a content item, such as errors affecting output/playback (e.g., bitrate errors, codec errors, playlist errors, protocol errors, etc.), occurrences of amplified and/or attenuated audio associated, occurrences of suboptimal color and/or suboptimal brightness relative to the display of the content item, and/or any other issue that may affect the output/playback experience. The aggregator 206 may aggregate events associated with output/playback of a content item to identify and/or determine similar events. Similar events and/or the same type of event being logged/stored and/or sent as telemetry data to the aggregator 206 may indicate a particular output/playback issue affecting the content item. The aggregator 206 may determine whether a threshold quantity of an output/playback issue (e.g., caused by one or more errors, etc.) affecting the content item exists based on a quantity of indications of the same type and/or similar event received with and/or determined from telemetry data.

For example, the user devices 201 and 202, may request a content item, such as an Episode A of a program, show, and/or the like. During output/playback (e.g., output, display, etc.) of Episode A, ten minutes from the start of Episode A, the user device 201 (a user of the user device 201) may adjust the volume of Episode A to reduce the volume by twenty percent. The volume adjustment at the user device 201 may cause the user device 201 to generate/log and/or send an event 221 indicative of the volume adjustment to the aggregator 206 as telemetry data. FIG. 3A is an example of telemetry data indicative of the event 221. Element 301 ("media_id") indicates that the content item associated with the event 221 is Episode A. Element 302 ("time_in_media") indicates that the event 221 occurred ten minutes from the start of the Episode A. Element 303 ("name") indicates that the event 221 was a down adjustment (e.g., reduction, etc.) of volume. Element 304 ("value_type") indicates that the down adjustment (e.g., reduction, etc.) of the volume was by twenty percent. The percentage may be relative to a base/standard volume and/or an average volume determined over a period of time, such as an average volume determined during an initial duration of the content item.

Returning to FIG. 2, the user device 201 may continue to generate telemetry data indicative of events associated with output/playback of the content item (e.g., Episode A). For example, during output/playback of Episode A, fifteen minutes from the start of Episode A, the user device 201 (a user of the user device 201) may adjust the volume of Episode A to increase the volume. The volume adjustment at the user device 201 may cause the user device 201 to generate/log and send another event indicative of the volume adjustment to the aggregator 206 as telemetry data. Over a course of time, multiple user devices may output/playback (e.g., output, cause output, display, cause display, etc.) the content item and experience the same and/or similar output/playback issue as the user device 201. For example, during output/playback of Episode A, ten minutes from the start of Episode A, the user device 202 (a user of the user device 202) may adjust the volume of Episode A to reduce the volume by twenty percent. The volume adjustment at the user device 202 may cause the user device 202 to generate/log and/or send an event 222 indicative of the volume adjustment to the aggregator 206 as telemetry data.

Any output/playback issue may be indicative of and/or associated with an event. For example, an event may be indicative of a user device, during output/playback of a content item, experiencing a halt/freeze of the content item, distorted images/content associated with the content item, intense visual output that causes an adjustment in color/brightness associated with the content item, a codec error, an occurrence when one or more portions of the content item unavailable, occurrences of misaligned and/or unsynchronized video and audio, and/or the like. A user device (e.g., the user devices 201, 202, and 203, etc.) may experience errors and/or output/playback issues caused by errors such as output/playback discontinuities (e.g., caused by timing information that does not align between audio and/or video segments of a content item, etc.), decoding errors, request errors (e.g., caused by a segment of a content item that routinely fails to be fetched according to a content reference file, etc.), dropped segments/frames/portions of a content item, and/or the like. The user device may monitor (e.g., generate telemetry data, etc.) output/playback of a content item and/or media progress of the content item and send a notification (e.g., telemetry data, etc.) to the aggregator 206 if the output/playback and/or media progress does not progress after a predetermined (e.g., configurable, preset, etc.) time/duration. The notification may account for and/or ignore any situation where the user device is in a paused state (e.g., purposeful non-progression, etc.). The notification may indicate an event. Event registering and/or determination may be a device-specific configuration. For example, different types of user devices may implement times/durations associated with output/playback and/or media progression for which a notification (event) is generated and/or sent, for example, to the aggregator 206. Different types of user devices may register and/or determine different types of events. For example, some user devices, based on a device type and/or configuration, may not register and/or determine dropped segments/portions (frames) as an event, any other user device, based on the device type and/or configuration, may register and/or determine dropped segments/portions (frames) as an event. Any output/playback issue may be indicative of and/or associated with an event, and any event may be included with and/or indicated by telemetry data.

The aggregator 206 may aggregate events (e.g., the event 221, the event 222, any indications of output/playback issues affecting output/playback, etc.) and determine if a threshold quantity of a particular output/playback issue affecting the content item exists. For example, the aggregator 206 may determine that a certain quantity and/or percentage of user devices are generating/logging and/or sending the same (and/or similar) indications of an event as telemetry data. The aggregator 206 may compare the quantity and/or percentage of user devices generating/logging and sending the same (and/or similar) indications of an event, to an event threshold. If the quantity and/or percentage of user devices generating/logging and sending the same (and/or similar) indications of an event satisfies the event threshold then, rather than the time-consuming and/or costly (e.g., resource cost, processing cost, etc.) endeavor of having the content item (e.g., Episode A) re-encoded to address the output/playback issue, the aggregator device 206 may generate adjustment data. The adjustment data may be used to address the output/playback issue during any subsequent output/playback of the content item.

The adjustment data may be an indication and/or instruction to the user device 203 that the user device 203 needs to and/or should perform some action to affect output/playback of the content item at the point during output/playback of the content item when an event occurs, such as a volume adjustment. For example, adjustment data may cause a volume adjustment to automatically occur at the user device 203 at the point during output/playback of the content item when the events 221 and 222 occur. The aggregator device 206 may generate and/or determine adjustment data associated with any content item that triggers adjustments at user devices (e.g., the user devices 201-203, etc.) that mitigate and/or resolve any output/playback issue.

Based on the event and/or associated output/playback issue (caused by one or more errors associated with a content item), adjustment data may cause a user device (e.g., the user devices 201-203, etc.) to automatically request one or more codecs associated with a content item, adapt/adjust bitrate of a content item and/or one or more portions of the content, request one or more portions of a content item from a different source, adjust an output/playback volume of a content item, adjust a brightness and/or color display of a content item, and/or the like to improve the user experience during output/playback of a content item. For example, adjustment data may include an instruction, cause one or more signals to be generated, include software and/or one or more software updates, and/or the like that: cause an audio level of the content item to satisfy an audio level threshold, cause a display intensity level of the content item to satisfy a display intensity threshold, cause an update of a codec associated with the content item, cause a bitrate adjustment of the content item, and/or the like to mitigate and/or resolve any output/playback issue caused by one or more errors associated with a content item. Adjustment data may include an instruction that causes a user device (e.g., the user devices 201-203, etc.) to send a signal to a device associated with the user device (e.g., a mobile/smart device, a remote control, etc.), that causes the device to send a signal to the user device, that causes an audio level of the content item to satisfy an audio level threshold, an instruction that causes a display intensity level of the content item to satisfy a display intensity threshold, and/or the like. Adjustment data may include code, operational instructions, resource locators, an executable file, a software update, and/or the like. Adjustment data may be device-specific data. For example, adjustment data may be generated/determined to address an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to generate/determine adjustment data.

FIG. 3B is an example of adjustment data generated to address the output/playback issue indicated by the events 221 and 222. Element 305 ("media_id") indicates that the content item associated with the adjustment data is Episode A. Element 306 ("time_range") indicates that the output/playback adjustment is to start at a time point/interval that is ten minutes from the start of the content item (Episode A) and end at a time point/interval that is fifteen minutes from the start of the content item (Episode A). The time range indicated by the element 306 may be because the events 221 and 222 occurred ten minutes from the start of the content item (Episode A) and that corresponding events occurred fifteen minutes from the start of the content item (Episode A), for example, when the user devices 201 and 202 (users of the user devices 201 and 202) adjusted the volume of the content item (Episode A) to increase the volume. Element 307 ("property_name") indicates that the output/playback adjustment required (to mitigate/resolve the output/playback issue) and/or to be caused is a down adjustment (e.g., reduction, etc.) of volume at a user device. Element 308 ("value_type") indicates that the down adjustment (e.g., reduction, etc.) of the volume required (to mitigate/resolve the output/playback issue) and/or to be caused is a downward adjustment by twenty percent. The percentage may be relative to a base/standard volume and/or an average volume determined over a period of time, such as an average volume determined during an initial duration of the content item.

Returning to FIG. 2, the aggregator 206 may associate the adjustment data with the content item. The aggregator 206 may store and/or associate an identifier of the adjustment data with an identifier of the content item, for example, in an adjustment data storage 208. The aggregator 206 may store and/or associate an identifier of the adjustment data with an identifier of the content item for a time period. The aggregator 206 may store and/or associate the adjustment data with an the content item for the time period. The aggregator 206 may store and/or associate the adjustment data with a content item reference file (e.g., a playlist, a manifest file, an MPD file, an index file, etc.) associated with the content item for the time period. During the time period the adjustment data may be sent to any user device that requests the content item. For example, the user device 203 may request the content item (Episode A). Based on the request for the content item, the aggregator 206 may determine if adjustment data is associated with the content item. The aggregator 206 may determine, for example, based on an identifier of the content item received with the request, that the content item is associated with the adjustment data.

The aggregator 206 may send (and/or cause the packager 205 to send), at 223, a manifest file associated with the content item (Episode A) and the adjustment data. For example, manifest and adjustment data 223 may include the manifest file and a sidecar file that includes the adjustment data. Alternatively, the manifest and adjustment data 223 may include the manifest file and the manifest may include and/or be configured with the adjustment data. For example, the packager 205 may receive periodic indications and/or updates from the aggregator 206 of content items that are associated with content items. When the request for the content item (Episode A) is received, the packager 205 may check the adjustment data storage 208 to determine and/or verify that the adjustment data (or any other adjustment data) is associated with the content item (Episode A). When the packager 205 generates the manifest file for the content item (Episode A), elements (e.g., time elements, metadata, references, etc.) may be included with the manifest file that cause adjustments in output/playback indicated by the adjustment data.

FIGS. 3C and 3D are examples of manifest (e.g., content reference files, etc.) that include and/or are associated with adjustment data to address/resolve the output/playback issue indicated by the events 221 and 222. FIG. 3C is an example HTTP Live Streaming (HLS) playlist associated with the content item (Episode A). Element 309 (EXT-X-ADJUSTMENT:PROPERTY) is a tag used in the playlist to indicate output/playback adjustment is to start (e.g., be retrieved/requested, etc.) at a time point/interval that is before a second segment (e.g., segment 2) of the content item, for example, ten minutes from the start of the content item (Episode A). Element 310 ("volume down") indicates that the output/playback adjustment required (to mitigate/resolve the output/playback issue) and/or to be caused is a down adjustment (e.g., reduction, etc.) of volume at a user device. Element 311 ("VALUE") and 312 ("VALUEFORMAT" a), together, indicate that the down adjustment (e.g., reduction, etc.) of the volume required (to mitigate/resolve the output/playback issue) and/or to be caused is a downward adjustment by twenty percent. The percentage may be relative to a base/standard volume and/or an average volume determined over a period of time, such as an average volume determined during an initial duration of the content item. The element 313 indicates that the duration of the down adjustment (e.g., reduction, etc.) of the volume is configured for a duration of 300 seconds (e.g., five minutes).

FIG. 3C is an example Dynamic Adaptive Streaming over HTTP (DASH) playlist associated with the content item (Episode A). Element 314 (EventStream schemeIdUri="urn:adjustment") indicates an output/playback adjustment. Element 315 (Event presentationTime="600") indicates that the output/playback adjustment is to start (e.g., be retrieved/requested, etc.) at a time point/interval that is 600 seconds (e.g., ten minutes) from the start of the content item (Episode A). Element 316 (duration="300") indicates that the duration of the output/playback adjustment is configured for a duration of 300 seconds (e.g., five minutes). Element 317 indicates that the output/playback adjustment required (to mitigate/resolve the output/playback issue) and/or to be caused is a down adjustment (e.g., reduction, etc.) of volume at a user device by twenty percent. The percentage may be relative to a base/standard volume and/or an average volume determined over a period of time, such as an average volume determined during an initial duration of the content item.

Adjustment data included with the manifest and adjustment data 223 may cause the user device 203 to automatically reduce the volume associated with output/playback of the content item (Episode A) by twenty percent ten minutes from the start of the content item, and increase the volume by twenty percent fifteen minutes from the start of the content item. The aggregator 206 may generate and/or determine adjustment data associated with any content item that triggers adjustments at user devices (e.g., the user devices 201, 202, and 203, etc.) that mitigate and/or resolve any output/playback issue. For example, adjustment data may cause a user device to automatically request one or more codecs associated with a content item, adapt/adjust the bitrate of a content item, request one or more portions of a content item from a different source, adjust an output/playback volume of a content item, adjust a brightness and/or color display of a content item, and/or the like to improve the user experience during output/playback of a content item. Adjustment data may be generated and/or updated, for example in real-time, as telemetry data associated with output/playback of a content item is aggregated and/or satisfies one or more associated thresholds. Accordingly, adjustment data may reflect the most recent user device output/playback experiences.

Adjustment data may be device-specific data. For example, adjustment data may be generated/determined to address an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to generate/determine adjustment data.

User devices (e.g., the user devices 201, 202, and 203, etc.) may be configured to periodically send a request, for example, to the aggregator 206 and/or the packager 205, to determine the existence of adjustment data and/or receive updates to adjustment data. For example, user devices (e.g., the user devices 201, 202, and 203, etc.) may periodically send requests for new and/or updated content item reference files (e.g., playlist, manifest files, MPD files, index files, etc.) associated with a content item that includes and/or is associated with adjustment data and/or updated adjustment data. When new adjustment data and/or updated adjustment data becomes available and/or associated with a content item after a user device has begun output/playback of the content item, the user device may receive the new adjustment data and/or updated adjustment data based on a periodic request and/or polling for the new adjustment data and/or updated adjustment data. In other words, rather than sending a single request for a content reference file associated with a content item (e.g., a static request for a content item, etc.), a user device may continuously request (e.g., dynamically request, etc.) the latest/newest content reference file associated with the content item that may also include adjustment data and/or a reference to the adjustment data.

Adjustment data generated for and/or associated with a content item may be sent to any user device (e.g., the user devices 201, 202, and 203, etc.) based on any request for the content item. An output/playback issue that adjustment data is generated for and/or determined to resolve may not affect output/playback of the content item at a particular user device, for example, based on the device type and/or configuration. A user device (e.g., the user devices 201, 202, and 203, etc.) may determine if adjustment data, for example, received as a sidecar file or configured with a content reference file, is applicable to the user device. For example, a sidecar file including adjustment data and/or a content reference file configured with adjustment data may include one or more indications of device types and/or configurations to which the adjustment data is applicable (e.g., configured for, etc.) for resolving output/playback issues associated with a content item. The user device may determine if its device type and/or configuration is indicated by the adjustment data. When the device type and/or configuration of the user device is indicated by the adjustment data, the user device may output/playback the content item and make adjustments (e.g., bitrate adjustments, codec adjustments, protocol adjustments, volume/display adjustments, resource locator adjustments, etc.) to the output/playback of the content item based on the adjustment data. When the device type and/or configuration of the user device is not indicated by the adjustment data, the user device may ignore any instructions, suggestions, and/or configurations associated with and/or caused by the adjustment data, and output/playback the content item as requested and/or as indicated by a content reference file because any output/playback issue associated with the adjustment data may not be affecting and/or affect the user device.

A user device (e.g., the user devices 201, 202, and 203, etc.) may selectively be affected by adjustment data received as a sidecar file or configured with a content reference file. A user device may determine that its device type and/or configuration is only associated with portions of adjustment data. For example, adjustment data may indicate that output/playback issues associated with a content item include volume control issues, display (e.g., color/intensity, etc.) issues, and issues such as pausing/freezing of content. Each output/playback issue may be a device-specific issue that only affects certain types of user devices. Each output/playback issue indicated by adjustment data may be associated with an indication of a device type and/or configuration. A user device (e.g., the user devices 201, 202, and 203, etc.) may select portions of adjustment data that are associated with output/playback issues indicated to be affecting a device type and/or configuration associated with the user device. For example, a user device may select portions of adjustment data associated with volume control issues and ignore portions of the adjustment data associated with display (e.g., color/intensity, etc.) issues based on its device type and/or configuration Telemetry data associated with user devices (e.g., the user devices 201, 202, and 203, etc.) may include indications of output/playback adjustments caused by adjustment data. Indications of output/playback adjustments caused by adjustment data may be used for tracking and/or reporting output/playback issues caused by errors that may be associated with a particular content source, service provider, system component/device, and/or the like. Indications of output/playback adjustments caused by adjustment data may be monitored, for example, by the aggregator 206 via telemetry data received from user devices (e.g., the user devices 201, 202, and 203, etc.), to determine if adjustment data received with subsequent requests for a content item resolves output/playback issues and/or portions of output/playback issues. For example, telemetry data associated with user devices may indicate that a volume control output/playback issue associated with output/playback of a content item is resolved by adjustment data and that a display payback issue may still be affecting user devices that subsequently request the content item. The adjustment data may be updated and/or reconfigured to address any output/playback issue indicated to be still affecting user devices.

FIG. 4 is a flowchart of an example method 400 for content output/playback adjustment. A content item may include and/or be associated with one or more errors. For example, the one or more errors may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like.

Output/playback issues caused by one or more errors may include: one or more portions of the content item that stall/freeze during output/playback (e.g., output, display, etc.), one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to display of the content item, etc.). To resolve any output/playback issue caused by one or more errors, one or more actions may be performed at and/or associated with the one or more user devices, such as an adjustment in volume, an adjustment in color/brightness, and/or the like.

One or more events may occur during the output/playback of a content item. The one or more errors associated with the content item, any output/playback issue caused by the one or more errors, and/or any action performed by and/or via a user device during output/playback of the content item in response to an output/playback issue, may indicate and/or correspond to an event occurring during output/playback of the content item. For example, a user device may request and output/playback a movie, a show, a program, and/or the like. At a given point during the output/playback, the movie, the show, the program, and/or the like may: halt/freeze, include distorted images/content, cause the output of amplified and/or attenuated audio which causes the volume to be adjusted, cause intense visual output which causes an adjustment in color/brightness, and/or the like. The halt/freeze and/or distorted images/content during output/playback (e.g., caused by the one or more errors), the volume adjustment, and the adjustment in color/brightness, may each be logged, stored, and/or identified as an event.

Any logged, stored, and/or identified event may be included with telemetry data associated with the one or more user devices. At 410, telemetry data associated with output/playback of a content item may be received. An aggregator (e.g., an edge device, a server, a computing device, etc.) may receive telemetry data associated with output/playback of a content item at one or more user devices (e.g., content output devices, content/media players, client devices, mobile devices, smart devices, etc.). Each of the one or more user devices may be configured to generate and send/transmit telemetry data regarding the state and/or operation of the user device. Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device, and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include and/or be formatted as chunks/fragments of information typically used in multimedia formats, metadata, and/or the like.

Telemetry data may be sent to the aggregator, for example, at periodic and/or random intervals. The aggregator may monitor and/or request telemetry data, for example, periodically and/or at random intervals. The aggregator may receive and aggregate telemetry data related to the output/playback of a content item. The one or more user devices may send to the aggregator, as telemetry data, indications of events with timing information that indicates when in the content item (e.g., at which duration/time during output/playback, etc.) the event occurred.

At 420, at least one event associated with output/playback of the content item may be determined. The aggregator may determine at least one event associated with output/playback (e.g., output, display, etc.) of the content item, for example, based on telemetry data. For example, the aggregator device may analyze telemetry data received from the one or more user device for one or more events that indicate issues occurring during output/playback of a content item, such as errors affecting output/playback (e.g., bitrate errors, codec errors, playlist errors, protocol errors, etc.), occurrences of amplified and/or attenuated audio associated, occurrences of suboptimal color and/or suboptimal brightness relative to the display of the content item, and/or any other issue that may affect the output/playback experience.

At 430, adjustment data configured to cause a user device to adjust output/playback of the content item may be determined and/or generated. The aggregator may determine and/or generate adjustment data based on telemetry data. Any event and/or indication of an event may be included with telemetry data associated with the one or more user devices. The aggregator may aggregate events associated with output/playback of a content item to identify and/or determine similar events. Similar events and/or the same type of event being logged/stored and/or sent as telemetry data to the aggregator may indicate a particular output/playback issue affecting the content item. The aggregator may determine whether a threshold quantity of an output/playback issue (e.g., caused by one or more errors, etc.) affecting the content item exists based on a quantity of indications of the same type and/or similar event received with and/or determined from telemetry data.

If a threshold quantity of a particular output/playback issue affecting the content item exists, rather than the time-consuming and/or costly (e.g., resource cost, processing cost, etc.) endeavor of having the content item re-encoded and/or the like, adjustment data may be generated to address the output/playback issue during a subsequent output/playback of the content item by a user device. The threshold may be configured such that any number/quantity of occurrences of a particular event triggers the generation of adjustment data to improve the output/playback experience associated with any subsequent request for the content item.

The aggregator may generate and/or determine adjustment data associated with any content item that triggers adjustments at user devices that mitigate and/or resolve any output/playback issue. For example, adjustment data may cause a user device to automatically request one or more codecs associated with a content item, adapt/adjust bitrate of a content item, request one or more portions of a content item from a different source, adjust an output/playback volume of a content item, adjust a display parameter (e.g., a luminance parameter, a color parameter, a hue parameter, or a resolution parameter, etc.), and/or the like to improve the user/output/playback experience during output/playback of a content item. For example, adjustment data may include an instruction that causes an audio level of a content item to satisfy an audio level threshold, an instruction that causes an adjustment to a display parameter, an instruction that causes an update of a codec associated with the content item, an instruction that causes a bitrate adjustment of one or more portions of a content item, and/or any other instruction that may mitigate and/or resolve an output/playback issue.

Adjustment data may include an instruction that causes a user device to send a signal to a device associated with the user device (e.g., a mobile/smart device, a remote control, etc.) that causes the device to send a signal to the user device, that causes an audio level of the content item to satisfy an audio level threshold, an instruction that causes a display intensity level of the content item to satisfy a display intensity threshold, and/or the like. Adjustment data may include code, operational instructions, resource locators, an executable file, a software update, and/or the like.

At 440, the adjustment data may be sent/transmitted. The adjustment data may be sent to a user device to facilitate adjusted output of the content item. For example, the aggregator may associate the adjustment data with the content item and send the adjustment data to a user device based on a request for the content item.

The aggregator may store and/or associate an identifier of the adjustment data with an identifier of the content item. The aggregator may store and/or associate the identifier of the adjustment data with the identifier of the content item for a time period. The aggregator may store and/or associate the adjustment data with a content item reference file (e.g., a playlist, a manifest file, an MPD file, an index file, etc.) associated with the content item for the time period. During the time period the adjustment data may be sent to any user device that requests the content item. Adjustment data may be generated and/or updated, for example in real-time, as telemetry data associated with output/playback of a content item is aggregated and/or satisfies one or more associated thresholds. Accordingly, adjustment data may reflect the most recent user device output/playback experiences. Adjustment data may be device-specific data. For example, adjustment data may be generated/determined to address an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to determine and/or generate adjustment data.

The aggregator may determine that the adjustment data is associated with the content item whenever a request for the content item is received. For example, a user device may request the content item previously received by the one or more user devices. The aggregator may determine, for example, based on an identifier of the content item received with the request, that the content item is associated with the adjustment data. The aggregator may send/transmit a content item reference file (e.g., a playlist, a manifest file, an MPD file, an index file, etc.) associated with the content item and the adjustment data to the user device. For example, the adjustment data may be sent to the user device with the content item reference file as a sidecar file. Alternatively, the adjustment data may be configured and/or included with the content item reference file.

The adjustment data may be an indication and/or instruction to the user device that the user device needs to and/or should perform some action to affect output/playback of the content item at the point during output/playback of the content item when the at least one event occurs, such as a volume adjustment. The adjustment data may cause the volume adjustment to automatically occur at the user device at the point during output/playback of the content item when the event occurs.

Telemetry data associated with one or more user devices may include indications of output/playback adjustments caused by adjustment data. Indications of output/playback adjustments caused by adjustment data may be used for tracking and/or reporting output/playback issues caused by errors that may be associated with a particular content source, service provider, system component/device, and/or the like. Indications of output/playback adjustments caused by adjustment data may be monitored, for example by the aggregator via telemetry data received from the one or more user device, to determine if adjustment data received with subsequent requests for the content item resolves output/playback issues and/or portions of output/playback issues. For example, telemetry data associated with one or more devices may indicate that a volume control output/playback issue associated with output/playback of a content item is resolved by adjustment data and that a display payback issue may still be affecting user devices of the one or more user devices that subsequently request the content item. The adjustment data may be updated and/or reconfigured to address any output/playback issue indicated to be still affecting user devices.

FIG. 5 is a flowchart of an example method 500 for content output/playback adjustment. At 510, a request for a content item may be received. An aggregator (e.g., an edge device, a server, a computing device, etc.) may receive a request for a content item from a user device (e.g., a content output device, a content/media player, a client device, a mobile device, a smart device, etc.).

At 520, at least one location identifier associated with the content item may be determined. A content item reference file (e.g., a playlist, a manifest file, an MPD file, an index file, etc.) may include at least one location identifier associated with the content item. For example, the request for the content item may include an identifier of the content item. The aggregator may use the identifier of the content item to request the content item reference file, for example, from a content packager, and/or the like.

At 530, adjustment data associated with the content item may be determined. The adjustment data may be an indication and/or instruction to a user device that the user device needs to and/or should perform some action to affect output/playback of the content item at the point during output/playback (e.g., output, display, etc.) of the content item when the at least one event occurs, such as a volume adjustment. The adjustment data may cause the volume adjustment to automatically occur at the user device at the point during output/playback of the content item when the event occurs. The aggregator may generate and/or determine adjustment data associated with any content item that triggers adjustments at user devices that mitigate and/or resolve any output/playback issue. For example, adjustment data may cause a user device to automatically request one or more codecs associated with a content item, adapt/adjust a bitrate of a content item, request one or more portions of a content item from a different source, adjust an output/playback volume of a content item, adjust a display parameter (e.g., a luminance parameter, a color parameter, a hue parameter, or a resolution parameter, etc.), and/or the like to improve the user/output/playback experience during output/playback of a content item. Adjustment data may include an instruction that causes an audio level of a content item to satisfy an audio level threshold, an instruction that causes an adjustment to a display parameter, an instruction that causes an update of a codec associated with the content item, an instruction that causes a bitrate adjustment of one or more portions of a content item, and/or any other instruction that may mitigate and/or resolve an output/playback issue. Adjustment data may include an instruction that causes a user device to send a signal to a device associated with the user device (e.g., a mobile/smart device, a remote control, etc.) that causes the device to send a signal to the user device, that causes an audio level of the content item to satisfy an audio level threshold, an instruction that causes a display intensity level of the content item to satisfy a display intensity threshold, and/or the like. Adjustment data may include code, operational instructions, resource locators, an executable file, a software update, and/or the like.

The aggregator, based on the identifier of the content item, may determine that adjustment data is associated with the content item. The identifier of the content item may be stored and/or associated with an identifier of the adjustment data. The identifier of the content item may be stored and/or associated with the identifier of the adjustment data for a time period. The aggregator may store and/or associate the adjustment data with a content item reference file (e.g., a playlist, a manifest file, an MPD file, an index file, etc.) associated with the content item for the time period. During the time period the adjustment data may be sent to any user device that requests the content item. Adjustment data may be generated and/or updated, for example in real-time, as telemetry data associated with output/playback of a content item is aggregated and/or satisfies one or more associated thresholds. Accordingly, adjustment data may reflect the most recent user device output/playback experiences. Adjustment data may be device-specific data. For example, adjustment data may be generated/determined to address an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to generate/determine adjustment data.

Each of the one or more user devices may be configured to generate and send/transmit telemetry data regarding the state and/or operation of the user device. During output/playback of a content item, each of the one or more user devices may generate telemetry data (e.g., metadata, code, script, etc.) that indicates the state and/or operation of the user device. Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include and/or be formatted as chunks/fragments of information typically used in multimedia formats, metadata, and/or the like.

Telemetry data may be sent to the aggregator, for example, at periodic and/or random intervals. The aggregator may monitor and/or request telemetry data, for example, periodically and/or at random intervals. The aggregator may receive and aggregate telemetry data related to the output/playback of a content item.

Telemetry data may include one or more indications of an event associated with output/playback of the content item The aggregator may determine at least one event associated with output/playback of the content item, for example, based on telemetry data. For example, the aggregator device may analyze telemetry data received from the one or more user devices for one or more events that indicate issues occurring during output/playback of a content item, such as output/playback issues caused by one or more errors associated with the content item. The one or more errors may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like.

Output/playback issues caused by the one or more errors may include: one or more portions of the content item that stall/freeze during output/playback, one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to the display of the content item, etc.). To resolve any output/playback issue caused by the one or more errors, one or more actions may be performed at and/or associated with the one or more user devices, such as an adjustment in volume, an adjustment in color/brightness, and/or the like.

One or more events may occur during the output/playback of a content item. The one or more errors associated with the content item, any output/playback issue caused by the one or more errors, and/or any action performed by and/or via the a user device during output/playback of the content item in response to an output/playback issue, may indicate and/or correspond to an event occurring during output/playback of the content item. The aggregator may generate adjustment data determined from telemetry data. For example, the aggregator may aggregate indications of events from telemetry data received from the one or more user devices and determine if a threshold quantity of a particular output/playback issue (e.g., event) affecting the content item exist. If a threshold quantity of indications of a particular output/playback issue affecting the content item exists (e.g., determined from aggregated events), rather than the time-consuming and/or costly (e.g., resource cost, processing cost, etc.) endeavor of having the content item re-encoded, the aggregator may generate adjustment data to address the output/playback issue during a subsequent output/playback of the content item by a user device.

At 540, the at least one location identifier and the adjustment data may be sent. The aggregator may send the at least one location identifier and the adjustment data to the user device based on the request for the content item. For example, the aggregator may send the user device the content item reference file that includes the at least one location identifier, and the adjustment data. The adjustment data may be sent to the user device with the content item reference file as a sidecar file. Alternatively, the adjustment data may be configured and/or included with the content item reference file.

The adjustment data may be an indication and/or instruction to the user device that the user device needs to and/or should perform some action to affect output/playback of the content item at the point during output/playback (e.g., output, display, etc.) of the content item when the at least one event occurs, such as a volume adjustment. The adjustment data may cause the volume adjustment to automatically occur at the user device at the point during output/playback of the content item when the event occurs. The aggregator may generate and/or determine adjustment data associated with any content item that triggers adjustments at user devices that mitigate and/or resolve any output/playback issue. For example, adjustment data may cause a user device to automatically request one or more codecs associated with a content item, adapt/adjust the bitrate of a content item, request one or more portions of a content item from a different source, adjust an output/playback volume of a content item, adjust a display parameter (e.g., a luminance parameter, a color parameter, a hue parameter, or a resolution parameter, etc.), and/or the like to improve the user/output/playback experience during output/playback of a content item. For example, adjustment data may include an instruction that causes an audio level of a content item to satisfy an audio level threshold, an instruction that causes an adjustment to a display parameter, an instruction that causes an update of a codec associated with the content item, an instruction that causes a bitrate adjustment of one or more portions of a content item, and/or any other instruction that may mitigate and/or resolve an output/playback issue.

Telemetry data associated with the one or more user devices may include indications of output/playback adjustments caused by adjustment data. Indications of output/playback adjustments caused by adjustment data may be used for tracking and/or reporting output/playback issues caused by errors that may be associated with a particular content source, service provider, system component/device, and/or the like. Indications of output/playback adjustments caused by adjustment data may be monitored, for example by the aggregator via telemetry data received from the one or more user device, to determine if adjustment data received with subsequent requests for the content item resolves output/playback issues and/or portions of output/playback issues. For example, telemetry data associated with the one or more devices may indicate that a volume control output/playback issue associated with output/playback of a content item is resolved by adjustment data and that a display payback issue may still be affecting user devices of the one or more user devices that subsequently request the content item. The adjustment data may be updated and/or reconfigured to address any output/playback issue indicated to be still affecting user devices.

FIG. 6 is a flowchart of an example method 600 for content output/playback adjustment. At 610, a content item may be output. A user device (e.g., a content output device, a content/media player, a client device, a mobile device, a smart device, etc.) may output a content item. For example, the user device may output/playback (e.g., output, cause output, display, cause display, etc.) the content item. The content item may include and/or be associated with one or more errors. For example, the one or more errors may include and/or be caused by: one or more corrupted files, one or more codec errors (e.g., a lack/absence of supporting codecs, encoding errors, decoding errors, compression errors, etc.), one or more transcoding errors, one or more unsupported file types, one or more unsupported drivers, one or more errors that cause interruptions during transfer/download of a content item (e.g., playlist errors, etc.), bitrate errors, protocol errors, and/or the like. The content item may be transmitted/sent to one or more user devices (e.g., content output devices, content/media players, client devices, mobile devices, smart devices, etc.) that each experience similar output/playback issues caused by the one or more errors associated with the content item.

Output/playback issues caused by the one or more errors may include: one or more portions of the content item that stall/freeze during output/playback, one or more portions of the content item where audio is much louder or quieter relative to other portions of the content item (e.g., occurrences of amplified and/or attenuated audio, etc.), one or more portions of the content item where the intensity of a color/brightness surpasses a threshold (for proper perception) and/or requires some other adjustment (e.g., occurrences of suboptimal color and/or suboptimal brightness relative to the display of the content item, etc.). To resolve any output/playback issue caused by the one or more errors, one or more actions may be performed at and/or associated with the one or more user devices, such as an adjustment in volume, an adjustment in color/brightness, and/or the like.

One or more events may occur during output/playback of a content item. The one or more errors associated with the content item, any output/playback issue caused by the one or more errors, and/or any action performed by and/or via the a user device during output/playback of the content item in response to an output/playback issue, may indicate and/or correspond to an event occurring during output/playback of the content item.

At 620, adjustment data may be received. The user device may receive the adjustment data. The adjustment data may be configured to cause an adjustment to the output of the content item at the user device. The adjustment data may be received by the user device, as a sidecar file, with a content item reference file (e.g., a manifest file, an MPD file, an index file, etc.) associated with the content item. Alternatively, the adjustment data may be configured and/or included with the content item reference file.

For example, each of the one or more user devices may be configured to generate and send/transmit telemetry data regarding the state and/or operation of the respective user device. During output/playback of a content item, each of the one or more user devices may generate telemetry data that indicates the state and/or operation of the respective user device. Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device, and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include and/or be formatted as chunks/fragments of information typically used in multimedia formats, metadata, and/or the like.

Telemetry data may be sent to an aggregator (e.g., an edge device, a server, a computing device, etc.), for example, at periodic and/or random intervals. The aggregator may monitor and/or request telemetry data, for example, periodically and/or at random intervals. The aggregator may receive and aggregate telemetry data related to the output/playback of the content item.

Telemetry data may include one or more indications of an event associated with the output/playback of the content item. For example, a user device may request and output/playback a movie, a show, a program, and/or the like. At a given point during the output/playback, the movie, the show, the program, and/or the like may: halt/freeze, include distorted images/content, cause the output of amplified and/or attenuated audio which causes the volume to be adjusted, cause intense visual output which causes an adjustment in color/brightness, and/or the like. The halt/freeze and/or distorted images/content during output/playback (e.g., the one or more errors), the volume adjustment, and the adjustment in color/brightness may each be logged, stored, and/or identified as an event.

Any logged, stored, and/or identified event may be included with telemetry data associated with the one or more user devices. Each user device may generate telemetry data that includes one or more indications of one or more events. The aggregator may determine at least one event associated with output/playback of the content item, for example, based on telemetry data. Any logged, stored, and/or identified event may be included with telemetry data associated with the one or more user devices. The aggregator may aggregate events associated with output/playback of a content item to identify and/or determine similar events. Similar events and/or the same type of event being logged/stored and/or sent as telemetry data to the aggregator may indicate a particular output/playback issue affecting the content item.

The user device may receive the adjustment data based on a quantity of indications of an event associated with an output of the content item satisfying an event threshold. For example, the aggregator may determine whether a threshold quantity of an output/playback issue (e.g., caused by one or more errors, etc.) affecting the content item exists based on a quantity of indications of the same type and/or similar event received with and/or determined from telemetry data. If a threshold quantity of a particular output/playback issue affecting the content item exists, rather than the time-consuming and/or costly (e.g., resource cost, processing cost, etc.) endeavor of having the content item re-encoded, adjustment data may be generated to address the output/playback issue during a subsequent output/playback of the content item by a user device. For example, the aggregator may generate the adjustment data. The threshold may be configured such that any number/quantity of occurrences of a particular event triggers the generation of adjustment data to improve the output/playback experience associated with any subsequent request for the content item.

At 630, the output of the content item may be adjusted. The user device may adjust the output of the content item based on the adjustment data. The user device may adjust the output of the content item based on the adjustment data, for example, without user intervention. For example, the adjustment data may be an indication and/or instruction to the user device that the user device needs to and/or should perform some action to affect the output of the content item at the point during output of the content item when the at least one event occurs, such as a volume adjustment. The adjustment data may cause the volume adjustment to automatically occur at the user device at the point during output of the content item where the event occurs. The aggregator may generate and/or determine adjustment data associated with any content item that triggers adjustments at user devices that mitigate and/or resolve any output/playback issue. For example, adjustment data may cause a user device to automatically request one or more codecs associated with a content item, adapt/adjust the bitrate of a content item, request one or more portions of a content item from a different source, adjust an output/playback volume of a content item, adjust a display parameter (e.g., a luminance parameter, a color parameter, a hue parameter, or a resolution parameter, etc.), and/or the like to improve the user/output/playback experience during output/playback (e.g., output, display, etc.) of a content item. For example, adjustment data may include an instruction that causes an audio level of a content item to satisfy an audio level threshold, an instruction that causes an adjustment to a display parameter, an instruction that causes an update of a codec associated with the content item, an instruction that causes a bitrate adjustment of one or more portions of a content item, and/or any other instruction that may mitigate and/or resolve an output/playback issue.

Telemetry data associated with one or more user devices may include indications of output/playback adjustments caused by adjustment data. Indications of output/playback adjustments caused by adjustment data may be used for tracking and/or reporting output/playback issues caused by errors that may be associated with a particular content source, service provider, system component/device, and/or the like. Indications of output/playback adjustments caused by adjustment data may be monitored, for example, by the aggregator via telemetry data received from the one or more user device, to determine if adjustment data received with subsequent requests for the content item resolves output/playback issues and/or portions of output/playback issues. For example, telemetry data associated with the one or more devices may indicate that a volume control output/playback issue associated with output/playback of a content item is resolved by adjustment data, and that a display payback issue may still be affecting user devices of the one or more user devices that subsequently request the content item. The adjustment data may be updated and/or reconfigured to address any output/playback issue indicated to be still affecting user devices.

Figure 7:
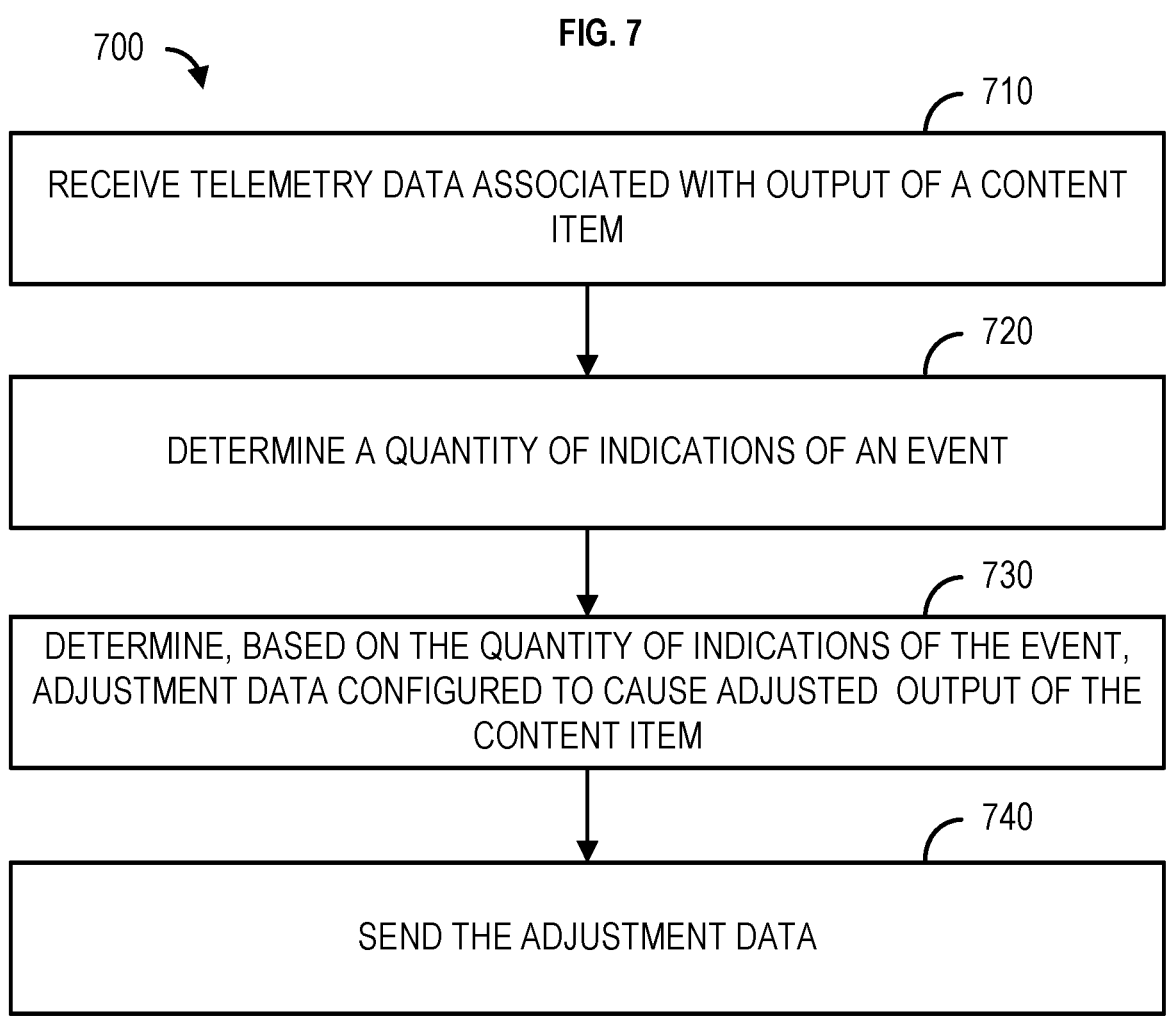
FIG. 7 shows a flowchart of an example method for content output adjustment.

FIG. 7 is a flowchart of an example method 700 for content output/playback adjustment. At 710, telemetry data associated with output/playback of a content item may be received. An aggregator (e.g., an edge device, a server, a computing device, etc.) may receive telemetry data associated with output/playback of a content item at one or more user devices (e.g., content output devices, content/media players, client devices, mobile devices, smart devices, etc.). Each of the one or more user devices may be configured to generate and send/transmit telemetry data regarding the state and/or operation of the user device. Telemetry data may include, for example, data/information from various data sources configured with and/or associated with a user device. For example, various data sources configured with and/or associated with a user device may include an application and/or API, a processor, a buffer, a sensor (e.g., haptic sensor, infrared sensor, an audio/voice detection device, and/or microphone, gyroscope, accelerometer, etc.), and/or any other component (e.g., hardware component, software component, etc.) of the user device. The data/information from various data sources may be collected and combined with timing data according to one or more automated communication processes before, during, and/or after output/playback of the content item. Telemetry data may include and/or be formatted as chunks/fragments of information typically used in multimedia formats, metadata, and/or the like.

Telemetry data may be sent to the aggregator, for example, at periodic and/or random intervals. The aggregator may monitor and/or request telemetry data, for example, periodically and/or at random intervals. The aggregator may receive and aggregate telemetry data related to the output/playback of a content item. The one or more user devices may send to the aggregator, as telemetry data, indications of events with timing information that indicates when in the content item (e.g., at which duration/time during output/playback, etc.) the event occurred.

The aggregator device may analyze telemetry data received from the one or more user device for one or more events that indicate issues occurring during output/playback of a content item, such as errors affecting output/playback (e.g., bitrate errors, codec errors, playlist errors, protocol errors, etc.), occurrences of amplified and/or attenuated audio associated, occurrences of suboptimal color and/or suboptimal brightness relative to the display of the content item, and/or any other issue that may affect the output/playback experience.

At 720, a quantity of indications of an event associated with output/playback of a content item may be determined. The aggregator may receive and aggregate telemetry data related to the output/playback of a content item. The one or more user devices may send to the aggregator, as telemetry data, indications of events with timing information that indicates when in the content item (e.g., at which duration/time during output/playback, etc.) the event occurred. The aggregator may determine the event based on the quantity of indications of the event received from the plurality of user devices (e.g., content output devices, content/media players, client devices, mobile devices, smart devices, etc.) satisfying an event threshold.

Any event and/or indication of an event may be included with telemetry data associated with the one or more user devices. The aggregator may aggregate events associated with output/playback of a content item to identify and/or determine similar events. Similar events and/or the same type of event being logged/stored and/or sent as telemetry data to the aggregator may indicate a particular output/playback issue affecting the content item. The aggregator may determine whether a threshold quantity of any output/playback issue (e.g., caused by one or more errors, etc.) affecting the content item exists based on a quantity of indications of the same type and/or similar event received with and/or determined from telemetry data.

At 730, adjustment data configured to cause a user device to adjust output/playback of the content item may be determined and/or generated. The aggregator may determine and/or generate adjustment data based on the quantity of indications of the event satisfying an event threshold.

If a threshold quantity of a particular output/playback issue affecting the content item exists, rather than the time-consuming and/or costly (e.g., resource cost, processing cost, etc.) endeavor of having the content item re-encoded and/or the like, adjustment data may be generated to address the output/playback issue during a subsequent output/playback of the content item by a user device. The threshold may be configured such that any number/quantity of occurrences of a particular event triggers the generation of adjustment data to improve the output/playback experience associated with any subsequent request for the content item.

The aggregator may generate and/or determine adjustment data associated with any content item that triggers adjustments at user devices that mitigate and/or resolve any output/playback issue. For example, adjustment data may cause a user device to automatically request one or more codecs associated with a content item, adapt/adjust a bitrate of a content item, request one or more portions of a content item from a different source, adjust an output/playback volume of a content item, adjust a display parameter (e.g., a luminance parameter, a color parameter, a hue parameter, or a resolution parameter, etc.), and/or the like to improve the user/output/playback experience during output/playback of a content item. For example, adjustment data may include an instruction that causes an audio level of a content item to satisfy an audio level threshold, an instruction that causes an adjustment to a display parameter, an instruction that causes an update of a codec associated with the content item, an instruction that causes a bitrate adjustment of one or more portions of a content item, and/or any other instruction that may mitigate and/or resolve an output/playback issue.

Adjustment data may include an instruction that causes a user device to send a signal to a device associated with the user device (e.g., a mobile/smart device, a remote control, etc.) that causes the device to send a signal to the user device, that causes an audio level of the content item to satisfy an audio level threshold, an instruction that causes a display intensity level of the content item to satisfy a display intensity threshold, and/or the like. Adjustment data may include code, operational instructions, resource locators, an executable file, a software update, and/or the like.

At 740, the adjustment data may be sent/transmitted. The adjustment data may be sent to a user device to facilitate adjusted output of the content item. For example, the aggregator may associate the adjustment data with the content item and send the adjustment data to a user device based on a request for the content item.

The aggregator may store and/or associate an identifier of the adjustment data with an identifier of the content item. The aggregator may store and/or associate the identifier of the adjustment data with the identifier of the content item for a time period. The aggregator may store and/or associate the adjustment data with a content item reference file (e.g., a playlist, a manifest file, an MPD file, an index file, etc.) associated with the content item for the time period. During the time period the adjustment data may be sent to any user device that requests the content item. Adjustment data may be generated and/or updated, for example in real-time, as telemetry data associated with output/playback of a content item is aggregated and/or satisfies one or more associated thresholds. Accordingly, adjustment data may reflect the most recent user device output/playback experiences.

Adjustment data may be device-specific data. For example, adjustment data may be generated/determined to address an output/playback issue caused by errors affecting a certain type of user device. Device types associated with adjustment data may be determined based on one or more identifiers (e.g., MAC addresses, network and/or IP addresses, device type identifiers, etc.) of user devices received and/or associated with telemetry data used to determine and/or generate adjustment data.

The aggregator may determine that the adjustment data is associated with the content item whenever a request for the content item is received. For example, a user device may request the content item previously received by one or more user devices. The aggregator may determine, for example, based on an identifier of the content item received with the request, that the content item is associated with the adjustment data. The aggregator may send/transmit a content item reference file (e.g., a playlist, a manifest file, an MPD file, an index file, etc.) associated with the content item and the adjustment data to the user device. For example, the adjustment data may be sent to the user device with the content item reference file as a sidecar file. Alternatively, the adjustment data may be configured and/or included with the content item reference file.

The adjustment data may be an indication and/or instruction to the user device that the user device needs to and/or should perform some action to affect output/playback of the content item at the point during output/playback of the content item when the at least one event occurs, such as a volume adjustment. The adjustment data may cause the volume adjustment to automatically occur at the user device at the point during output/playback of the content item when the event occurs.

Telemetry data associated with one or more user devices may include indications of output/playback adjustments caused by adjustment data. Indications of output/playback adjustments caused by adjustment data may be used for tracking and/or reporting output/playback issues caused by errors that may be associated with a particular content source, service provider, system component/device, and/or the like. Indications of output/playback adjustments caused by adjustment data may be monitored, for example by the aggregator via telemetry data received from the one or more user device, to determine if adjustment data received with subsequent requests for the content item resolves output/playback issues and/or portions of output/playback issues. For example, telemetry data associated with one or more devices may indicate that a volume control output/playback issue associated with output/playback of a content item is resolved by adjustment data and that a display payback issue may still be affecting user devices of the one or more user devices that subsequently request the content item. The adjustment data may be updated and/or reconfigured to address any output/playback issue indicated to be still affecting user devices.

Figure 8:
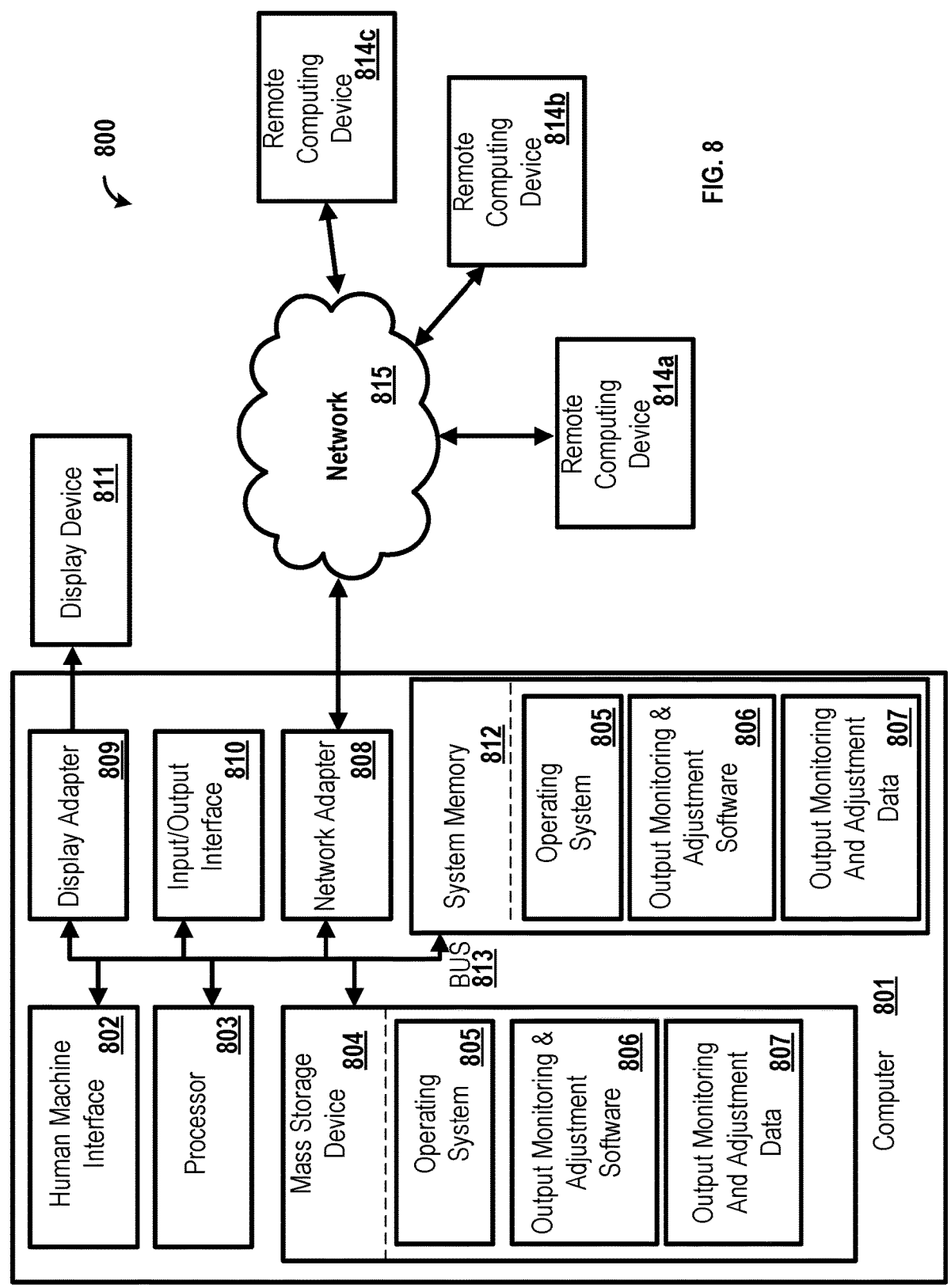
FIG. 8 shows an example block diagram of a computing device for implementing content output adjustment.

FIG. 8 shows a system 800 for content output/playback adjustment. Any device/component described herein may be a computer 801 as shown in FIG. 1.

The computer 801 may comprise one or more processors 803, a system memory 812, and a bus 813 that couples various components of the computer 801 including the one or more processors 803 to the system memory 812. In the case of multiple processors 803, the computer 801 may utilize parallel computing.

The bus 813 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer-readable media (e.g., non-transitory). Computer-readable media may be any available media that is accessible by the computer 801 and comprises, non-transitory, volatile and/or non-volatile media, removable and non-removable media. The system memory 812 has computer-readable media in the form of volatile memory, such as random access memory (RAM), and/or non-volatile memory, such as read-only memory (ROM). The system memory 812 may store data such as output monitoring and adjustment data 807 and/or program modules such as operating system 805 and output monitoring and adjustment software 806 that are accessible to and/or are operated on by the one or more processors 803.

The computer 801 may also comprise other removable/non-removable, volatile/non-volatile computer storage media. The mass storage device 804 may enable non-volatile storage of computer code, computer-readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 804. An operating system 805 and output monitoring and adjustment software 806 may be stored on the mass storage device 804. One or more of the operating system 805 and output monitoring and adjustment software 806 (or some combination thereof) may comprise program modules and the output monitoring and adjustment software 806. Output monitoring and adjustment data 807 may also be stored on the mass storage device 804. Output monitoring and adjustment data 807 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human-machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), a light-emitting diode (LED) display, a television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814a,b,c. A remote computing device 814a,b,c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 801 and a remote computing device 814a,b,c may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of output monitoring and adjustment software 806 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    receiving, based on a plurality of requests for a content item from a plurality of user devices, telemetry data, wherein the telemetry data comprise a plurality of indications of events and associated timing information;
    determining, based on the plurality of indications of events, one or more events satisfying a first threshold indicative of a quality of the one or more events;
    determining, based on a quantity of the one or more events satisfying a second threshold and based on the associated timing information, adjustment data; and
    causing, based on a subsequent request for the content item and based on the adjustment data, a second output of the content item.

2. The method of claim 1, wherein the telemetry data comprises metadata aggregated during a first output of the content item that indicates the one or more events.

3. The method of claim 1, wherein the plurality of indications of events are indicative of the one or more events and one or more amounts of changes associated with the one or more events.

4. The method of claim 1, wherein the one or more events indicate at least one of: an error affecting an output of the content item, an audio level adjustment of an audio level of the content item, or a display parameter adjustment of a display parameter of the content item.

5. The method of claim 4, wherein the error affecting the output of the content item comprises at least one of: a bitrate error, a codec error, a playlist error, or a protocol error.

6. The method of claim 4, wherein the display parameter comprises at least one of: a luminance parameter, a color parameter, a hue parameter, or a resolution parameter.

7. The method of claim 1, wherein determining the adjustment data comprises determining a sidecar file comprising the adjustment data.

8. The method of claim 1, wherein the adjustment data comprises at least one of: metadata associated with the one or more events, a codec associated with the one or more events, or a time range to one or more portions of the content item associated with the one or more events.

9. The method of claim 1, further comprising associating the adjustment data with the content item.

10. The method of claim 1, wherein causing the second output of the content item comprises sending a manifest file associated with the content item and a sidecar file comprising the adjustment data.

11. The method of claim 1, wherein causing the second output of the content item comprises sending a manifest file comprising one or more references to one or more content segments of the content item and one or more indications of the adjustment data.

12. A method comprising:
    receiving, based on a plurality of requests for a content item from a plurality of user devices, telemetry data, wherein the telemetry data comprise a plurality of indications of events and associated timing information;
    determining, based on a quantity of the plurality of indications of events satisfying a first threshold, one or more events;
    determining, based on the one or more events satisfying a second threshold indicative of a quality of the one or more events and based on the associated timing information, adjustment data; and
    causing, based on a subsequent request for the content item and based on the adjustment data, a second output of the content item.

13. The method of claim 12, wherein the one or more events indicate at least one of: an error affecting a first output of the content item, an audio level adjustment of an audio level of the content item, or a display parameter adjustment of a display parameter associated with the content item.

14. The method of claim 12, wherein the subsequent request for the content item comprises a content item identifier of the content item, the method further comprising:
    determining, based on the content item identifier of the content item, an adjustment data identifier of the adjustment data; and
    determining, based on the adjustment data identifier of the adjustment data, the adjustment data.

15. The method of claim 12, wherein the adjustment data comprises at least one of: a first instruction that causes an audio level of the content item to satisfy an audio level threshold, a second instruction that causes a display parameter adjustment of a display parameter, a third instruction that causes an update of a codec associated with the content item, a fourth instruction that causes a bitrate adjustment of a bitrate associated with one or more portions of the content item, or one or more time ranges associated with one or more adjustment actions to mitigate the one or more events.

16. The method of claim 12, wherein causing the second output of the content item comprises sending a manifest file associated with the content item and a sidecar file comprising the adjustment data.

17. A method comprising:
  receiving, based on a plurality of requests for a content item, based on a quantity of a plurality of indications of events associated with a first output of the content item, based on one or more events satisfying a first threshold indicative of a quality of the one or more events, and based on timing information associated with the first output of the content item, adjustment data, wherein the quantity of the plurality of indications of events satisfies a second threshold; and
  causing, based on the adjustment data and based on a subsequent request for the content item, a second output of the content item.

18. The method of claim 17, wherein receiving the adjustment data comprises receiving the adjustment data as a sidecar file to a manifest file associated with the content item.

19. The method of claim 17, wherein receiving the adjustment data comprises receiving a manifest file comprising one or more references to one or more portions of the content item and one or more indications of the adjustment data.

20. The method of claim 17, wherein the second output of the content item comprises at least one of: causing an audio level of the content item to satisfy an audio level threshold, causing an adjustment to a display parameter, updating a codec associated with the content item, or adjusting a bitrate associated with one or more portions of the content item.

* * * * *